United States Patent
Richiger

(10) Patent No.: US 12,187,555 B2
(45) Date of Patent: Jan. 7, 2025

(54) EXTRACTOR OF MATERIAL STORED IN SILO BAGS THAT ROLLS UP USED PLASTIC AND EJECTS THE RESULTANT BALES

(71) Applicant: AGROINDUSTRIA Y SERVICIOS G Y G S.R.L., Sunchales (AR)

(72) Inventor: Gabriel Alberto Richiger, Sunchales (AR)

(73) Assignee: AGROINDUSTRIA Y SERVICIOS G Y G S.R.L., Sunchales (AR)

( * ) Notice: Subject to any disclaimer, the term of this patent is extended or adjusted under 35 U.S.C. 154(b) by 0 days.

(21) Appl. No.: 18/047,677

(22) Filed: Oct. 19, 2022

(65) Prior Publication Data
US 2023/0117974 A1     Apr. 20, 2023

(30) Foreign Application Priority Data
Oct. 20, 2021    (AR) .............................. 20210102893

(51) Int. Cl.
*A01D 90/02*     (2006.01)
*A01D 90/12*     (2006.01)
(Continued)

(52) U.S. Cl.
CPC ............ *B65G 65/22* (2013.01); *A01D 90/02* (2013.01); *A01D 90/12* (2013.01); *A01F 25/14* (2013.01);
(Continued)

(58) Field of Classification Search
CPC ...... B65G 65/22; B65G 67/06; B65G 41/008; A01D 90/02; A01D 90/12; A01F 25/14; A01F 29/005; B65B 69/0008
(Continued)

(56) References Cited

U.S. PATENT DOCUMENTS

| | | |
|---|---|---|
| 4,420,119 A | 12/1983 | Johnson |
| 6,109,552 A | 8/2000 | Strankman |

(Continued)

FOREIGN PATENT DOCUMENTS

| | | |
|---|---|---|
| AR | 042763 A1 | 7/2005 |
| AR | 074278 A1 | 5/2015 |

(Continued)

*Primary Examiner* — Lynn E Schwenning
(74) *Attorney, Agent, or Firm* — The Morales Law Firm; Joseph L. Morales, Esq.

(57) ABSTRACT

An improved silo bag extractor that can collect grain or other flowable materials contained therein. As the extractor empties the silo bag's contents into an accompanying grain cart, it simultaneously performs differentiated cuts on the bag, effectively dividing it in two bands of plastic that are directed to the left and right sides of the machine, where they wind tightly around roll-up assemblies equipped with consumable rigid plastic cores. On terminating grain extraction, the used plastic sheet takes the form of two very dense bales that can each weigh 100 kilos or more depending on the original size of the bag. These bales are then released from the machine automatically, proffering several advantages: not having to manually collect large swaths of plastic, not having to rewind the plastic on a second contraption and accomplishing lesser compaction in the process, easier storing and handling, and lower transportation costs to recycling centers.

18 Claims, 13 Drawing Sheets

(51) Int. Cl.
*A01F 25/14* (2006.01)
*A01F 29/00* (2006.01)
*B65B 69/00* (2006.01)
*B65G 65/22* (2006.01)
*B65G 67/06* (2006.01)

(52) U.S. Cl.
CPC ........ *A01F 29/005* (2013.01); *B65B 69/0008* (2013.01); *B65G 67/06* (2013.01)

(58) Field of Classification Search
USPC ....................................................... 414/412
See application file for complete search history.

(56) References Cited

U.S. PATENT DOCUMENTS

| | | | |
|---|---|---|---|
| 7,802,956 B2 | 9/2010 | Schertz et al. | |
| 7,861,851 B2 | 1/2011 | Dekoning | |
| 7,997,849 B2 | 8/2011 | Twiestmeyer et al. | |
| 8,251,630 B2 | 8/2012 | Hilsabeck et al. | |
| 8,336,704 B2 | 12/2012 | Dekoning | |
| 8,602,710 B2* | 12/2013 | Lambertini | A01F 25/20 |
| | | | 414/412 |
| 9,221,639 B2* | 12/2015 | Wierenga | B65H 18/10 |
| 9,301,451 B2 | 4/2016 | Zastrow et al. | |
| 9,907,233 B2 | 3/2018 | Dekoning | |
| 10,165,731 B2* | 1/2019 | Errazquin | A01F 25/20 |
| 2011/0226589 A1 | 9/2011 | Gaviglio | |
| 2012/0189413 A1 | 7/2012 | Richiger | |

FOREIGN PATENT DOCUMENTS

| | | |
|---|---|---|
| AU | 2006100411 A4 | 6/2006 |
| WO | 2017075676 A1 | 5/2017 |

* cited by examiner

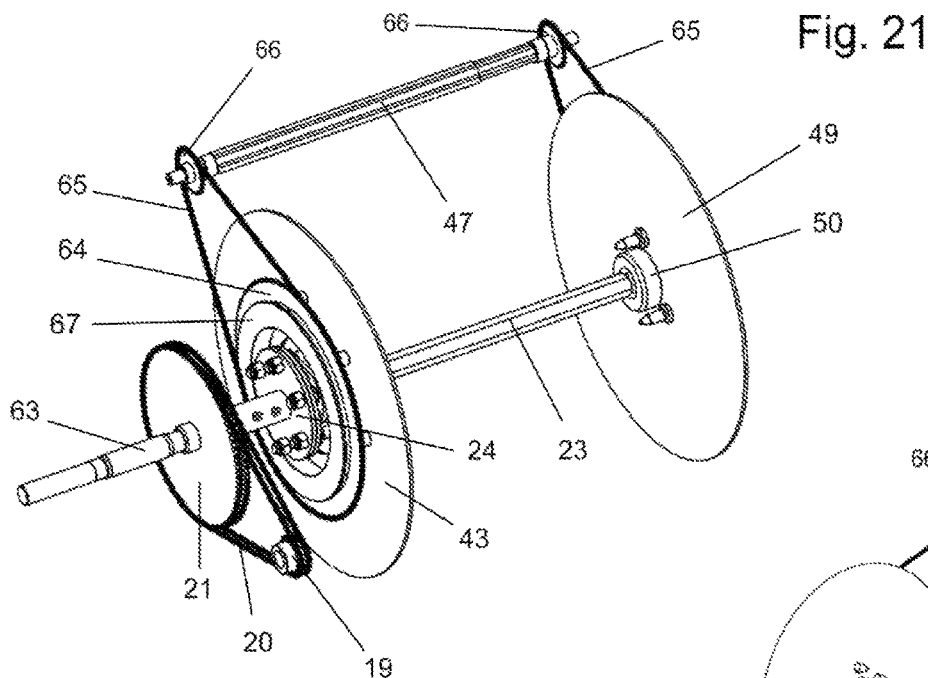
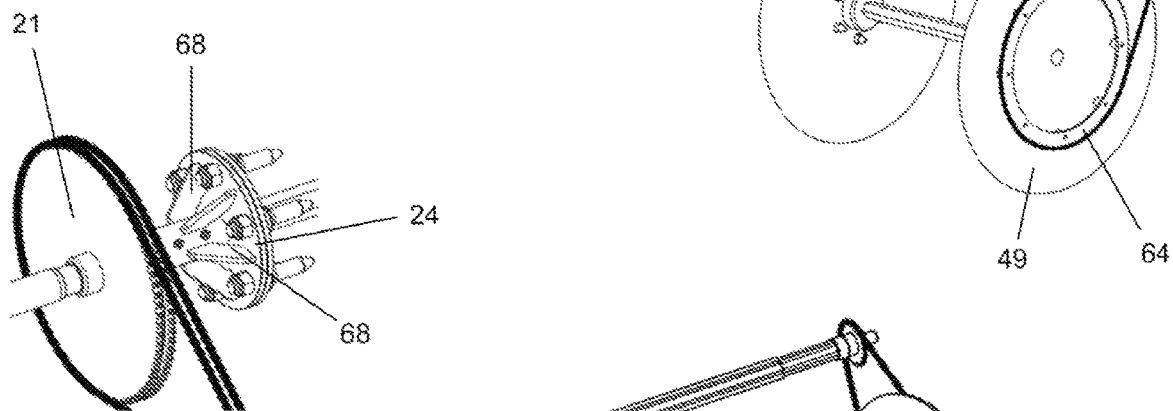
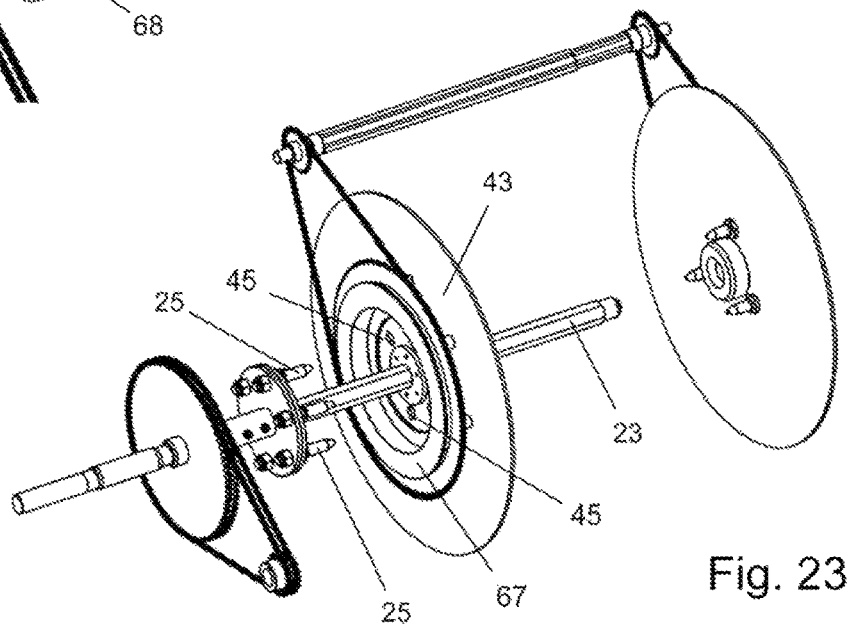

EXTRACTOR OF MATERIAL STORED IN SILO BAGS THAT ROLLS UP USED PLASTIC AND EJECTS THE RESULTANT BALES

CROSS-REFERENCE TO RELATED APPLICATIONS

This application claims priority from Argentinean application serial number AR 2021-0102893 filed on Oct. 20, 2021, which is incorporated herein by reference in its entirety.

BACKGROUND OF THE INVENTION

Silo bags are large sized high density polyethylene (known by the acronym HDPE) tube shaped bags used to store agricultural produce. When they store grains such as maize, wheat or barley they are generally called grain bags, and in the present description we will refer to them with this term or silo bags, or simply as bags.

Specialized machines are used for (a) putting material inside a grain bag, and (b) unloading material from a grain bag. The present specification concerns the second scenario, the unloading of grain, and the machine performing this task will be referred to as a grain bag extractor or simply as an extractor in the present disclosure. Bags can vary in diameter from approximately 1.8 to 3 meters and in length from approximately 60 to 150 meters. Capacity can reach hundreds of metric tons. Each bag is originally a tube or sleeve open at both ends that manufacturers deliver folded in accordion-like folds or pleats, so that on initiation they are in the shape of rings. Bags are single use only and recyclable.

Modern grain bagging machines, or grain baggers, that store grain have turned this specialty into a quick, straightforward procedure. They are designed to perform this task as fast as combine harvesters and grain carts can deliver the grain, and bagging rates ranging from 300 to 1,200 tons/hour are commonplace.

One advantage of using plastic bags for storage instead of relying solely on permanent facilities is low cost and the fact that as few or as many bags as needed are utilized, optimizing storage cost/benefit ratio. Although grain baggers have been in regular use for quite a few years, the design of grain bag extractors that could match the working pace of baggers lagged behind. Contrasting with the relative simplicity of introducing grain inside bags, taking it out in an efficient way proved a bigger challenge.

One particular development for unloading bags proved critical—Alfredo Palou's Patent AR042763B1 awarded Oct. 12, 2005, Argentina—to overcome the limitations of simply introducing an auger inside a bag to unload it. Virtually all grain bag extracting machines in the market are based on this development, which is that of a variable speed, hydraulically driven rotatable bag pickup roller or winder mounted on a wheeled frame. Because the bag filled with grain constitutes an unmovable mass, the pickup rollers work as winches that use the very body of the bag to pull the extractor along as unloading progresses.

A critical consideration about plastic is disposal after use. HDPE is one of the most eligible plastics for recycling, but with leftover silo bags the problem is gathering and carrying them away from crop locations that range far and wide. Even within the same farm, leftover plastic sites can be far apart from one another because bags are most often deployed right next to the field that is being harvested. This is done to speed up storage proceedings because time is of the essence.

Extractors only store the used plastic of one bag at a time. The standard procedure to unload used plastic is to allow the pickup roller to turn freely while tractor and extractor advance, causing the plastic to be unfurled on the ground. This arrangement results in long swaths of plastic, sometimes hundreds of meters long, that needs to be removed.

The usual method of retrieving the used plastic of a typical 60 to 150 meter long bag laying on the ground is to take hold of one of the ends between two people and repeatedly fold the sheet inward while pressing down on the successive layers until a more or less square package of multiple layers is assembled. Not only is this an inefficient process that demands manpower and time, but the volume to weight ratio is high since plastic becomes stiff and crinkly from months in the sun and the layers do not stack up well. When collecting a used bag, a very considerable increase in volume can be estimated relative to the volume of that same bag new in the box, so freight costs can be substantial.

Due to this inconvenience, several manufacturers have of late offered systems for collecting used plastic in a more efficient way. Broadly, the extracting machines that are outfitted with a secondary plastic recovery system can be classified within two different groups as follows:

Type A

Those systems that collect the used plastic with the extractor's pickup roller or plurality of rollers and that without releasing it on the ground then convey it to a secondary roller or plurality of rollers for rewinding and posterior release, also as a bale but in this case easily releasable. This system has the disadvantage of the secondary bale not possessing the enormous compaction of the primary bale, one of the reasons because the latter cannot be released from a standard extractor. An example of this system is described in patent grant U.S. Pat. No. 8,251,630B2 with priority date 2008 Jun. 12.

Type B

Those systems that release the used plastic directly from the bag pickup roller or rollers. This method circumvents the second step described in type A systems whereby the plastic is conveyed to a secondary spool or spools for rewinding and subsequent release. Examples of type B systems are patent grant U.S. Pat. No. 8,602,710B2 with priority date 2009 Aug. 31 and patent grant U.S. Pat. No. 9,221,639B2 with priority date 2013 Mar. 12. These designs use either a single roller or dual rollers to collect the used plastic. In these designs, the bag pickup roller consists of a central shaft that tapers down from the two outer sections of shaft toward the center section of shaft. The outer sections of shaft are delimitated by discs or plates so that the used plastic cannot wind off the shaft. The shaft disconnects and separate at the center section, thus splitting into two half shafts that can be retracted or pulled apart so the plastic is released.

Machines manufactured under patent U.S. Pat. No. 8,602,710B2 by assignee Carlos Mainero y Cia ICF/SA hit the market but were discontinued after a few years. This machine has two pickup rollers and each roller's half shafts are designed to be pried open manually, with no recourse to mechanically drawing them apart. Each roller is positioned in a vertical position, relatively high up from the ground, and because the upper half shaft needs to be pulled upward and not sideways it made the prying apart particularly difficult as manual force was more difficult to apply. The half shafts often jammed due to plastic being wound very tightly around them and stalled the operation when plastic could not be dislodged.

U.S. Pat. No. 9,221,639B2 covers machines manufactured by assignee Neeralta Manufacturing Inc and utilizes a single roller to collect the used plastic. One disadvantage of this is that a 150 meter long, 3 meter diameter bag (or 500 ft long, 10 ft diameter bag) weighs about 200 or more kilos. Manhandling this weight as a single parcel is practically impossible if only one person is available as is the case in many farms, so more people may have to be involved when the rolls are moved around and loaded manually.

All silo bag extractors in the market possess two kinds of power drive, mechanical and hydraulic, usually provided by an agricultural type tractor that is attached to the extractor, to which can be added electrical power to command certain functions. Even a fully electrical drive could be conceived to power the present machine.

Another alternative that is possible with a silo bag extractor is for it to be fitted with a power plant mounted on the frame of the machine itself, said power plant comprising an internal combustion engine or potentially even an electric motor plus a hydraulic pump and hydraulic oil reservoir. In this case and just as way of example, a wheel can be mounted on the tongue section of the extractor and controlled manually with a ratchet mechanism to perform slight turns in direction as needed to align the extractor with the silo bag being unloaded. This can be applied to the extractor of the present disclosure. Another possibility is to hitch a trailer or wheeled platform to the extractor in a similar way that a conventional tractor would be hitched. The wheeled platform would be equipped with a power unit to provide mechanical and hydraulic capacity to the extractor and would not need wheel drive since it would be tugged along by the extractor as the latter rolls up the bag. Such a wheeled platform does exist in the market at present. In short, the extractor of the present disclosure can be adapted to operate with different power preparations.

SUMMARY OF THE INVENTION

The present invention for which a Utility patent is requested, has as its main object a SILO BAG EXTRACTOR THAT ROLLS UP USED PLASTIC AND EJECTS THE RESULTANT BALES, set apart by the novel feature that at the same time the extraction of stored material is being done, at least two strips of continuous plastic bands are produced and rolled up by way of the lengthwise cut of the silo bag that is being emptied, and that thereafter the resulting rolls or bales of used plastic are ejected for the purpose of transporting and recycling them.

More to the point, the present invention covers an extracting machine for granular materials and equivalent materials that works in association with a tractor through mechanical and hydraulic drives and controls to allow the extraction of the material that is then discharged into a truck, grain cart, or equivalent container.

For the aim of extracting the stored material, the extracting machine is equipped with a discharge auger that goes into the bag and remains close to the bag's bottom section. The auger projects upward with lateral inclination to deliver material to the truck or grain cart that advances adjacent to the machine, with final delivery accomplished through a downspout fitted to its upper end.

This discharge auger, centrally placed near the bag's bottom, works in unison with a pair of cross augers aligned horizontally at both sides of it, so that these cross augers sweep up material as the machine advances and direct it to a central point where it is picked up by the discharge auger.

Instead of winding the bag's used plastic around a single transversal roller, in the particular case of the extracting machine of the present invention the plastic is wound around twin rollers arranged on a transversal axis so that two very compact bales are produced simultaneously with the silo bag being emptied.

Upon conclusion of the extraction process, the rolled strips or bands of used plastic now in the form of bales are tied up and ejected, ready for collection and subsequent recycling. In other words, the bales ejected by the machine are the very same that are produced when the bag is emptied, with no further secondary repackaging steps involved.

From the preceding, it can be stated that the invented machine responds to a working principle that consists in producing two compact bales or rolls, which originate from two lengthwise cuts to the bag performed by an upper located blade first, and by a lower located blade in second place as the extraction of material is in progress.

After the first mentioned cut, the plastic is diverted through side deflectors onto a free turning roller that acts as a support that helps maintain a hollow containment space within the bag. This space ensures that the collecting cross augers are continuously submerged in the material that is being extracted.

In short, this is a machine that extracts granular flowing material contained in a silo bag, with the capacity of dividing the bag in two separate continuous bands of plastic and of rolling them up as the material in the bag is being unloaded. Once extraction is finished, the machine expels the plastic in the form of two compact and tied bales, facilitating collection and transport for final disposal.

Besides grain, the machine can work with a wide variety of materials that are granular or that can flow, such as sand, fertilizers, forage pellets, concentrates, plastic pellets and others. We will refer to this machine and to similar machines as grain extractors or simply extractors.

As an invention, this grain extractor proposes a new combination of means to achieve a superior end result, a result that is surprising and unpredictable even to one knowledgeable in the art. Consequently, besides being new, its constructive and functional conception shows a clear inventive activity that fulfills the conditions required by law to apply for a patent application.

Advantages. The silo bag extractor that is referred to in this disclosure arises from detecting a series of realities that this activity entails, of which the following are relevant:

The bag material is a thermoplastic (HDPE) that can be recycled.

Empty bags lying on the field are contaminating.

Burning this material is not sustainable.

It is necessary to collect, compact and transport it.

Conventional extractors roll up the bag during the extraction procedure, but cannot get rid of the used plastic nor collect it again without devising extra steps.

This entails that after extracting the stored material the used plastic is normally unrolled onto the field, bringing about the consequent difficulty of having to collect it afterwards.

From the premises briefly mentioned in the previous lines, a question arises: Why not design a machine that can directly eject the compacted plastic bales? In other words, a machine to avoid having to unroll the assembled bales and solve the problem of having to repackage the plastic strewn on the field, and furthermore to have the capability of assembling extremely compact rolls for ease of transport and storage.

The silo bag extractor that rolls up used plastic and ejects the resultant bales presents the novel feature that instead of collecting the bag plastic via a single roller, it does so by means of twin rollers mounted on a corresponding structure that is transversally expansible.

Indeed, the extractor of this disclosure uses these twin rollers as winches that bring in the emptied section of the bag as stored material is extracted from it.

The novelty consists in that, simultaneously with the process of emptying the bag, bales of great compaction are being produced. Consequently, when the extraction process is completed, the used plastic is fully contained in the rollers.

The disclosed machine provides the capability of tying up and then expelling the bales. In other words, the bales ejected by the machine are the very same bales produced at the time the bag is being emptied, without additional steps required.

To let the rollers do their work, the extractor of the present specification performs two cuts on the bag by means of corresponding blades: a first lengthwise cut of the top section of bag to allow entry of the discharge auger and the cross augers that will evict the stored material, and a second lengthwise cut of the bottom section of bag that divides the bag into two continuous strips of plastic.

The extractor of the disclosure includes corresponding side deflectors that orient the two continuous strips of plastic to the mentioned collecting rollers.

To ensure that the mentioned cross augers are always immersed in the material being discharged, the extractor of the disclosure includes a free-turning cylinder that maintains invariant the angle at which the used plastic is taken up by the rollers.

From the preceding paragraphs that refer to this disclosure, the following advantages can be inferred:

Once extraction has finalized, high density compact cylindrical bales secured with twine are obtained, ready to handle.

The extractor can roll up hundreds of meters of bag plastic of different diameters without interrupting the procedure, to then expel the finished bales in a size that is amenable to handling.

Excellent compaction of the bales is obtained. Since bales are obtained through rolling up the silo bag under great tension as part of the extraction process, great compaction is the end result.

As the diameter of the bales increases, the operational efficiency of the extractor is not affected.

BRIEF DESCRIPTION OF THE DRAWINGS

To exemplify advantages of the machines described here, in referral to which users and experts in the field could enlarge upon, and to facilitate comprehension of constituent, constructive and functional aspects of the present specification, a favored embodiment is illustrated schematically with no particular attention to size or scale. It should be noted that since the enclosed drawings are presented as examples, no limiting or exclusive characteristics should be associated with them as they are meant to relay the basic concepts covered by the invention.

FIG. 7 is a schematic view of the left side of the extractor with components removed to follow the path of the plastic as it goes through.

FIG. 21 is a first perspective view of a sliding enclosure, with its structural supports removed to show the motion and drive system in a non-extended configuration.

FIG. 22 is a second perspective view of a sliding enclosure, with its structural supports removed to show the motion and drive system.

FIG. 23 is a third perspective view of a sliding enclosure, with its structural supports removed to show the motion and drive system in an extended configuration.

FIG. 24 is a detailed view of one portion of the sliding enclosure.

DETAILED DESCRIPTION

To understand the constructive details of the extractor, the component parts and their interaction are described in the following paragraphs.

On several occasions in the present specification when describing the extractor and mentioning the location of parts on it or the directions in which those parts move, for example: internal, interior, drawn in, closed, retracted and proximal against their opposites external, exterior, open, drawn out, extended and distal, the terms refer in every case to positions relative to the longitudinal central axis or central section 26 of the machine. An inner, internal, interior or proximal component is closest to the central axis than its outer, external, exterior or distal counterpart, which is farther away. Likewise, moving in or inwardly is meant as getting closer to the machine's central axis whereas moving out or outwardly is meant as moving farther away from the central axis.

1) Mechanical Driveline Transmitting Power to Sweep Augers and Discharge Tube

Figure 1:
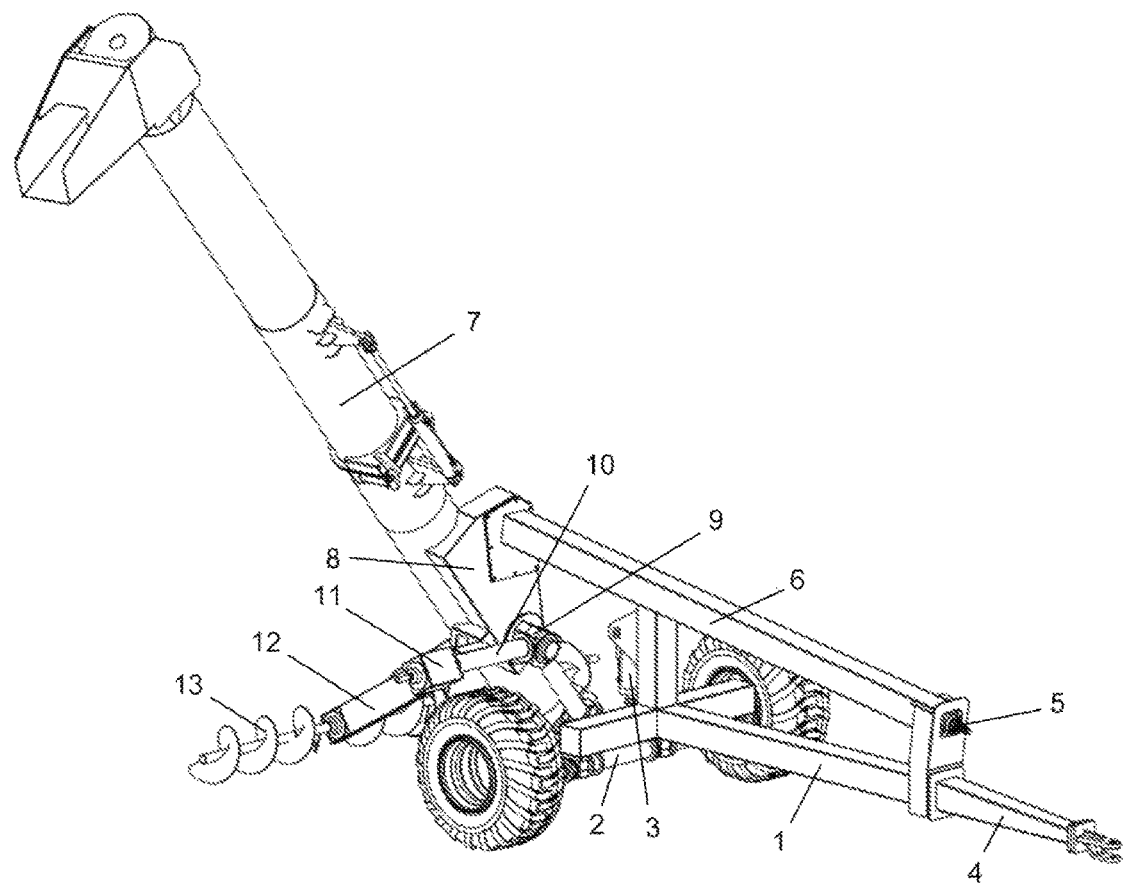
FIG. 1 is a perspective view of the right hand side of a grain bag extractor wheeled frame comprising mechanical drive components.

FIG. 1 shows a right side view of a frame assembled over a lower beam 1 coupled to wheel assembly 2 whereby hydraulic cylinder 3 controls height clearance to the ground. The wheeled frame also comprises a forwardly extending tongue 4 for hitching to a power-providing tractor. A PTO (Power Take-Off) drive shaft (not shown) connects to a tractor's PTO and transmits power to the extractor by means of a second drive shaft encased within main beam 6, not visible except for its splined end stub 5. Main beam 6 solidly connects through weldment or weld assembly 8 to discharge tube 7. The rearward end of the drive shaft encased in main beam 6 has a 1st sprocket gear (not shown) mounted rotationally thereon, around which wraps a roller chain (not visible) extending downward through weld assembly 8 and connecting to a 2nd sprocket gear (not visible) mounted rotationally on the input shaft (not visible) of gear box 9. Gear box 9 has two output shafts, the first of which (not visible) extends within horizontal housing 10 and couples at its far end with a 3rd sprocket gear (not visible) in gear box 11. A roller chain (not visible) wraps around the 3rd sprocket gear and descends through housing 12 to connect to a 4th sprocket gear (not visible) rotationally mounted on the central axle of transverse sweep augers 13. For clarification, the term sweep augers (plural) can also signify a single sweep auger. In the latter case, it would mean a single shaft on which is mounted a left hand flight on one side and a right hand flight on the other so that the material converges to the center to be picked up by the discharge auger contained within the discharge tube, or in the first case it can mean several augers or auger sections aligned on the same axis for the same purpose. For example, it is common practice that in order to adapt extractors to silo bags of different diameters, sweep auger sections are added or taken off.

Figure 2:
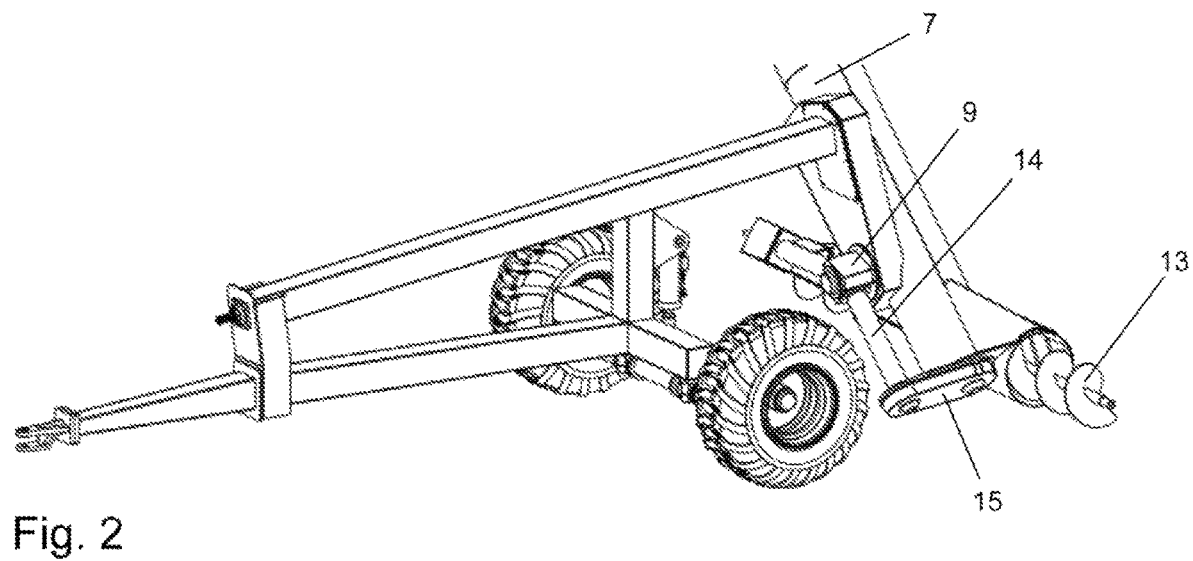
FIG. 2 is a partial perspective view of the left hand side of the grain bag extractor wheeled frame comprising additional mechanical drive components.

FIG. 2 shows a partial left side view of wheeled frame 1. It depicts the second output shaft (not visible) of gear box 9 descending through housing 14 and going into gear box 15 located at the lower extremity of discharge tube?. Within gear box 15 a 5th sprocket gear (not visible) is rotationally mounted on the far end of second output shaft of gear box 9. A roller chain (not visible) wraps around the 5th sprocket gear and connects to a 6th sprocket gear (not visible) within gear box 15. The 5th sprocket gear is mounted on the central shaft (not visible) of a screw auger (not visible) that runs inside discharge tube 7, providing movement to unload material from the bag. Other elevating systems such as bucket conveyors could be used instead of a screw auger.

FIGS. 1 and 2 represent the components of a mechanical drivetrain that initiates at a power source, normally an agricultural tractor's Power Take-Off. Once the extractor attaches to the tractor through tongue 4, both machines conform a tandem. The mechanical drivetrain components and its connections are well known to those skilled in the art. Operationally, sweep augers 13 collect the grain along the width of the bag by means of its sweep augers having different helicoid flights, one a left hand flight and the other a right hand flight such that both converge approximately to a middle section to be conveyed upward and outward of the extractor through discharge auger 7. It is to be noted that sweep augers 13, by means of hydraulic cylinder 3, maintain some clearance from the ground, and thus a certain distance to the bottom of grain bag 35 (see FIG. 7). Otherwise the plastic could be torn by contact with the sweep augers.

Figure 3:
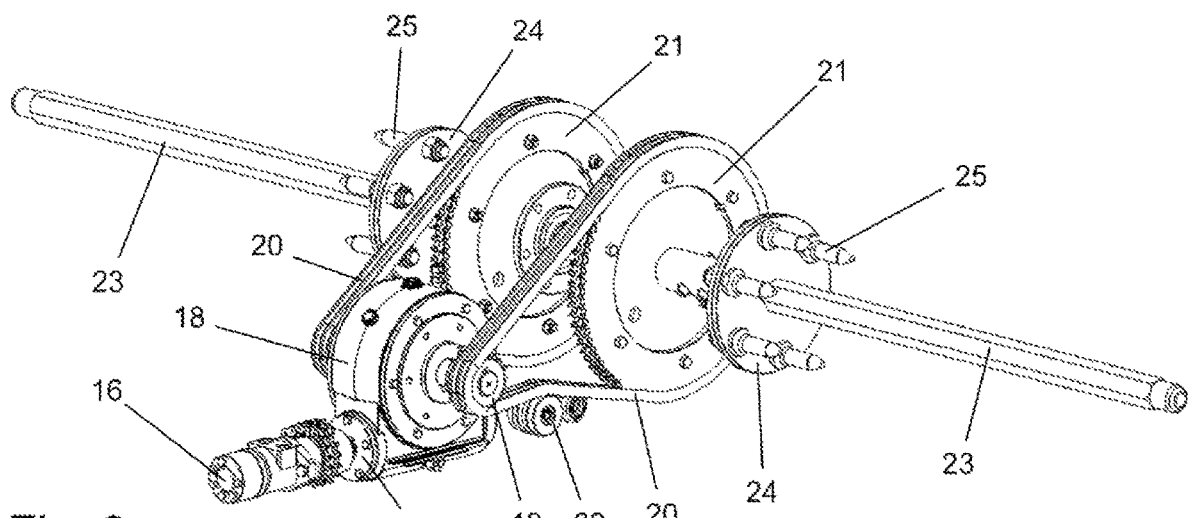
FIG. 3 is a perspective view of the hydraulic motor and the connected sprocket and chain transmission that drives the roll-up shafts.

2) Bag Pickup Rollers Powered by Hydraulic Motor, Crossbar Assembly, Lateral Deflectors, Free-Turning Roller and Cutter Blades FIG. 3 shows the working principle of the extractor of the present specification. A variable speed hydraulic motor 16 transmits power, through a coupling 17, to a gear box 18 that is characterized in having dual output shafts projecting out to the left and right sides of the machine. At the ends of these shafts are mounted drive double sprockets that transmit power to their respective driven double sprockets 21 through roller chains 20. A chain tensioner 22 can be observed. A roll-up shaft 23, preferably with a polygonal cross section, attaches to each double sprocket 21 in order that they can gyrate in unison. In turn, a discoid plate 24 that carries a number of inner prongs 25 is firmly affixed to each roll-up shaft 23.

Prongs 25 hook up and retain the plastic bands created when the bag is cut, allowing the plastic to be rolled into bales as will be explained. The drive provides discoid plates 24 with high torque in combination with very low angular speed and an rpm regime that can be adjusted with great precision. Roller chains 20 exert symmetrical radial force on the bearings and elements that form part of the assembly, whilst gear box 18 is set on solidly mounted brackets to ensure adequate strength and resistance.

Figure 4:
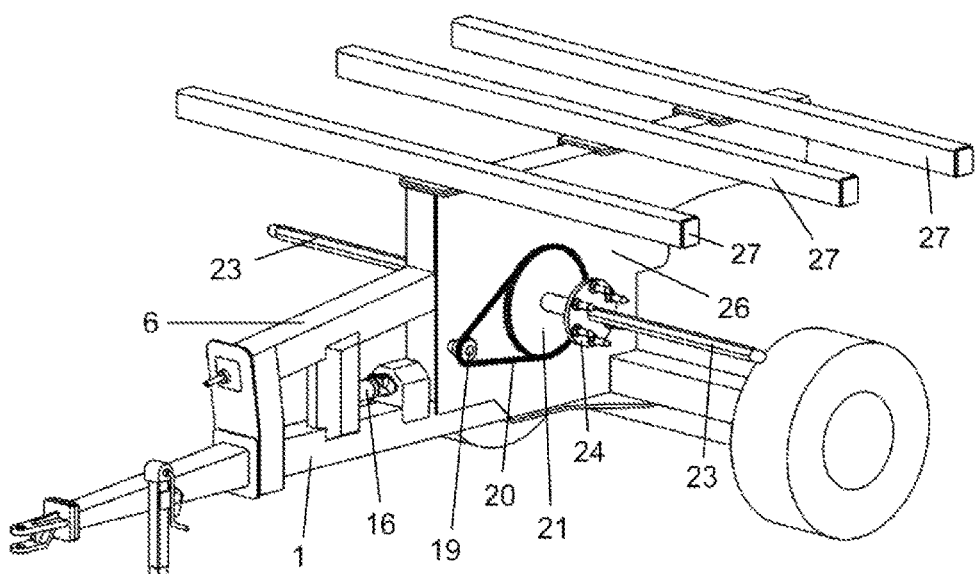
FIG. 4 is a left side perspective view of the extractor frame depicting the support crossbars, the roll-up shafts and other constituent parts.

FIG. 4 schematically shows how the drive assemblage of FIG. 3 is inserted in the wheeled frame delimited at the bottom by lower beam 1. In the front section of the wheeled frame, normally covered by panels 29 (see FIG. 6), hydraulic motor 16 can be observed whilst gear box 18 is hidden by the panels that cover the extractor's central body 26. On the left side of the wheeled frame can be seen double sprocket 19, roller chain 20 and double sprocket 21, the latter joined in unison with roll-up shaft 23 and discoid plate 24. Corresponding right side roll-up shaft 23 can also be observed. Chain tensioner detailed in FIG. 3 is omitted in this drawing. Crossbars 27 are mounted over central body 26 to form a support rack perpendicular to main beam 6. The two front crossbars 27 will hold up right side sliding enclosure 37 and left side sliding enclosure 38 (see FIG. 25), whereas rear crossbar 27 will support lateral deflectors 30 (see FIGS. 6 and 7) between both of which is mounted a free-turning roller 34 (see FIGS. 6, 7 and 26).

Figure 5:
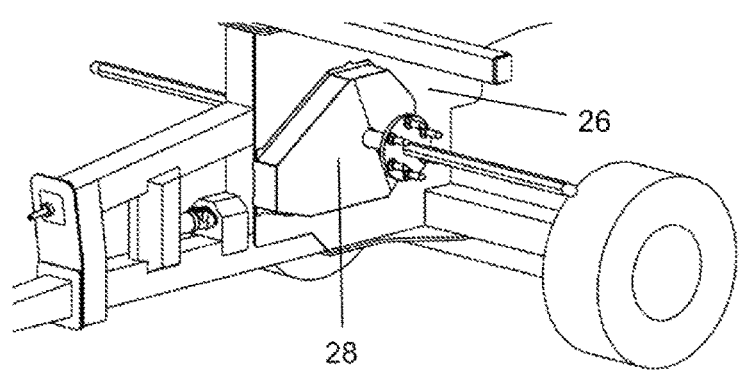
FIG. 5 is a left side perspective view of the extractor frame depicting an additional component compared with FIG. 4.

FIG. 5 shows housing 28 on the left side of the machine that covers the transmission detailed in FIG. 4 (hiding sprockets 19 and 21, and roller chain 20) to leave visible only roll-up shaft 23 with discoid plate 24.

Figure 6:
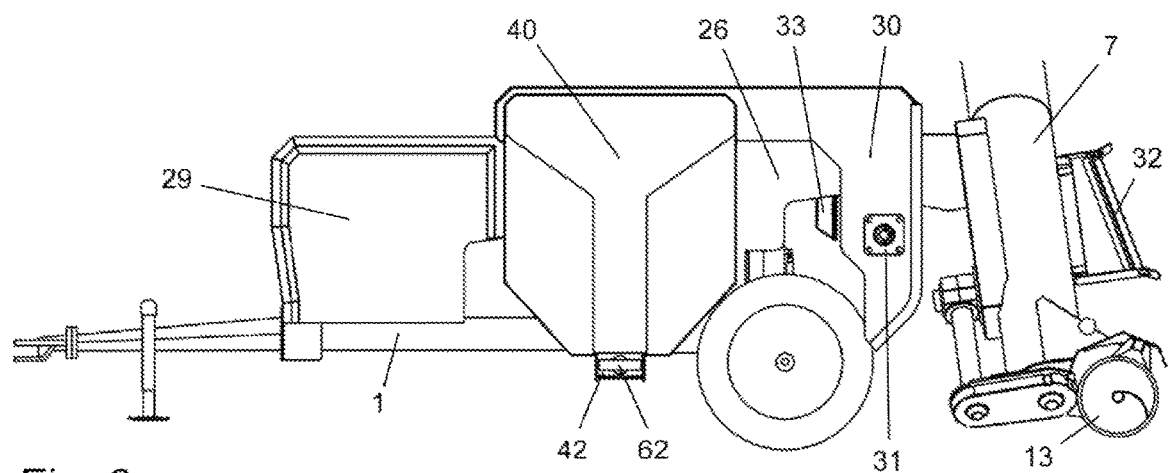
FIG. 6 is a schematic view of the left side of the extractor showing several components.
Figure 7:
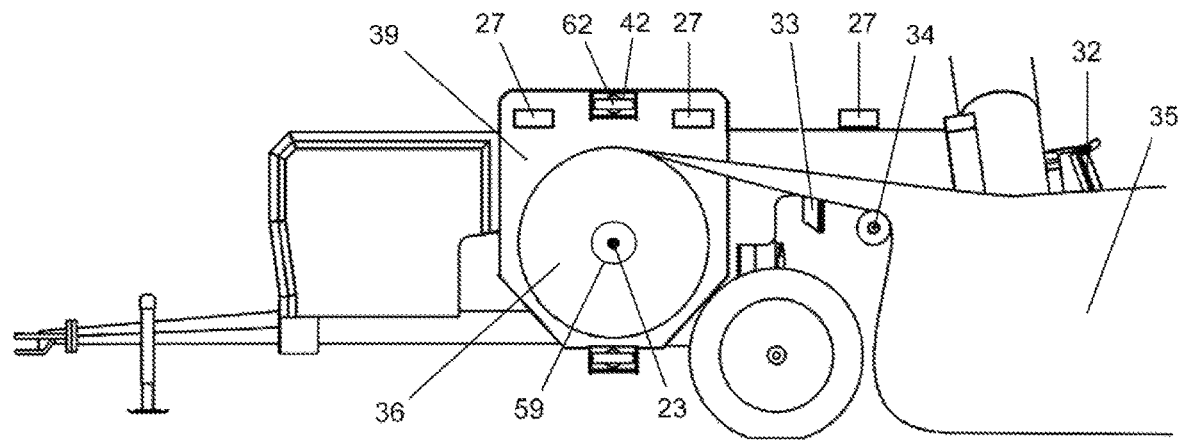

In FIGS. 6 and 7 can be observed the fundamental aspect of the present specification consisting in that rolling up the bag takes place simultaneously with the extraction and unloading of material through sweep augers 13 and discharge tube 7 respectively. The path of the bag as it is picked up going through lateral deflectors 30, located at both sides of the machine, of free-turning roller 34 that acts as a support, and the positioning of the cutter blades are crucial aspects to produce two bands of plastic that can be rolled up by the extractor without the bag losing its shape while its being collected, nor losing material through the cuts performed.

Figure 14:
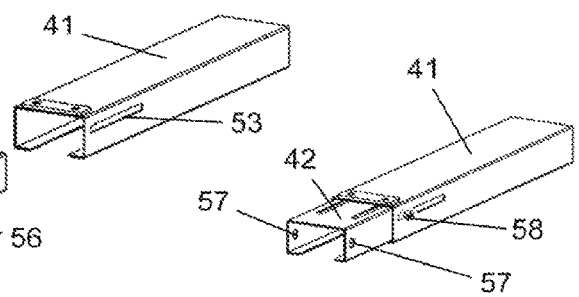
FIG. 14 is a perspective view of two components of a telescopic assembly joined and in an extended configuration.

FIG. 6 shows the left side of the machine, with lower beam 1, a panel 29 covering the frontal section of the wheeled frame from where the hydraulic assembly powers the roll-up shafts and a sliding structure 38 (see FIG. 8) in the under part of which can be seen yoke 62 attached to the end section of telescopic arm 42 (see FIG. 14). On the back section, mounted on corresponding rear crossbar 27 (see FIG. 4) can be seen a pillow block 31 that supports one end of free-turning roller 34 (see also FIG. 26).

Attached to the rear surface of discharge tube 7 can be observed a 1st cutter blade 32 or equivalent, whilst on the lower section of central body 26, in front of lateral deflectors 30, can be seen a 2nd cutter blade 33 or equivalent. The term "equivalent" in the case of the cutter blades refers to any suitable cutting element, which could include for instance a taut wire acting as an electrical resistance that cuts through by melting the plastic sheet, or any other system.

In the next FIG. 7 lateral deflectors 30 and pillow blocks 31 are removed on both left and right sides, leaving free-turning roller 34 visible. Also removed is outer panel 40 along with the drive mechanisms shielded behind it and outer revolving disc 49, both belonging to a left side sliding enclosure 38 (see FIGS. 8 and 11), so that an inner panel 39 (see FIG. 9) and crossbars 27 (see FIG. 4), as well as the end of upper telescopic arm 42 and yoke 62 of the corresponding hydraulic cylinder are all now visible.

FIG. 7 shows the path of bag 35 within the machine. If an imaginary longitudinal and horizontal cut were to be done on the bag, we'd be left with an upper and a lower or floor section of bag. The extractor of the present disclosure uses a 1st cutter blade to perform a continuous lengthwise cut on the topmost section of bag. The cut is continuous because it takes place simultaneously with the bag being taken up by the extractor and is never interrupted whilst material is retrieved from it. From this first cut onward, the bag is directed through lateral deflectors 30 (see FIGS. 6 and 26) that limit its width to the width of the machine and its roller pickup system. As it goes through the lateral deflectors, the lowermost section of bag travels over free-turning roller 34. The roller acts as a support for the engorged frontal section of the bag, a kind of inner chamber, which does not modify its shape or dimensions whilst the extraction lasts. This bulging frontal section forming a chamber ensures that sweep augers 13 (see FIG. 6) are always surrounded by material. As can be observed, roller 34 being an invariable point in space ensures that the progressive increase in diameter of plastic bale 36, amassed around a plastic or consumable tube 59 that in turn surrounds roll-up shaft 23, does not affect the shape of the mentioned inner chamber as the bag is pulled up. This geometry also prevents the bag, for instance, from making contact with the machine's wheels. After passing over free-turning roller 34, the bag undergoes a second continuous lengthwise cut along its lowermost section. This is performed by a 2nd cutter blade 33 that completes separation of the bag in two separate bands that advance simultaneously to the left and right sides of the machine. In the view proffered by FIG. 7 can be seen the used plastic bale 36 that corresponds to the left side plastic band, whilst the right side band is collected on the other side. The periphery of consumable tube 59, around which the plastic band of bale 36 winds up is also observed, as is the periphery of roll-up shaft 23.

FIG. 7 shows how consumable tube 59 allows used plastic bale 36 to detach or slide off with such ease from roll-up shaft 23 upon being ejected, as there is a clearance between the consumable tube and the roll-up shaft. If the plastic were to be wound directly around the roll-up shaft without the intervening consumable tube, its tightness and compaction would be so considerable it would absolutely impede dislodgement of the used plastic from the roll-up shaft. Even if the consumable tube should crack and fracture due to the pressure exerted by the bag's HDPE plastic, which does happen on occasion, the friction coefficient remains low enough for the plastic bale to slide off the roll-up shaft.

3) Sliding Enclosures, Hydraulic Cylinders that Provide Lateral Motion, and Synchronized Drive that Provides Rotating Movement What are defined as right and left sliding enclosures 37 and 38 respectively (FIG. 8) are the supporting structures that move between inner and outer positions, their movement being transversal to the lengthwise axis of the extractor. They are mounted on crossbars 27 (FIGS. 4 and 25) and actuated upon by hydraulic cylinders. It is pertinent to point out that in the present embodiment, the mentioned hydraulic cylinders 70 with their component parts 60, 61 and 62 (FIG. 16) are driven by the tractor's primary hydraulic system (which also drives height regulating hydraulic cylinder 3 seen in FIG. 1) and not managed through the already described assemblage that initiates with hydraulic motor 16 of FIG. 3. This assemblage is exclusively employed to operate the circular movement of sliding enclosures 37 and 38 as will be presently explained.

Figure 8:
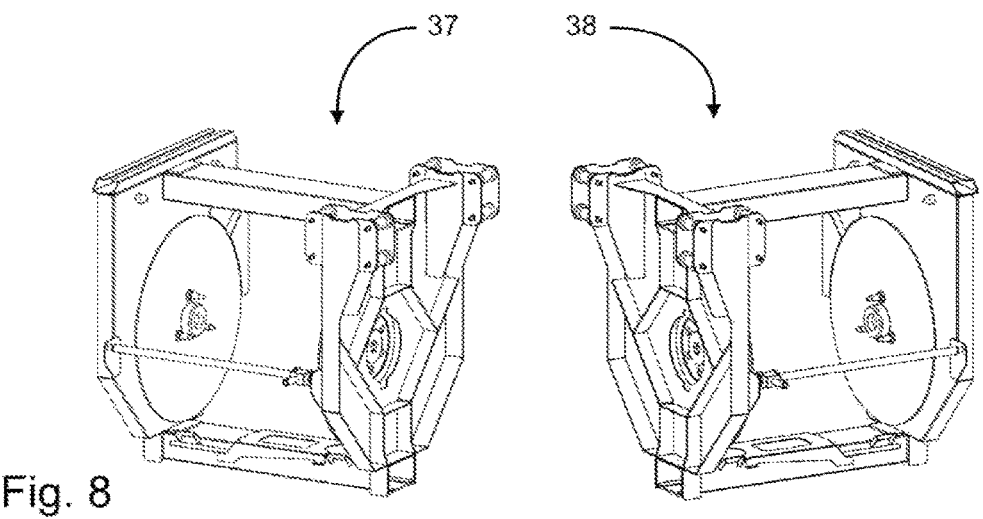
FIG. 8 is a perspective view of a right side sliding enclosure and of a left side sliding enclosure.

In FIG. 8 a difference is established between right side sliding enclosure 37 and left side sliding enclosure 38, which although similar and having the same components, are mirror images of each other. An enclosure is sometimes referred to in the present specification as being left hand side or right hand side, but it should be remembered that any component of, or action performed by either the left or the right enclosure is also applicable to its left or right counterpart.

The sliding enclosures are located on the flanks or homologous right and left sides of the machine. To recognize which side of the extractor is being addressed in the present specification, consider an operator standing at the rear of the machine, looking forward to its front end, and referencing the corresponding side in accordance with his own right and left arms.

Figure 9:
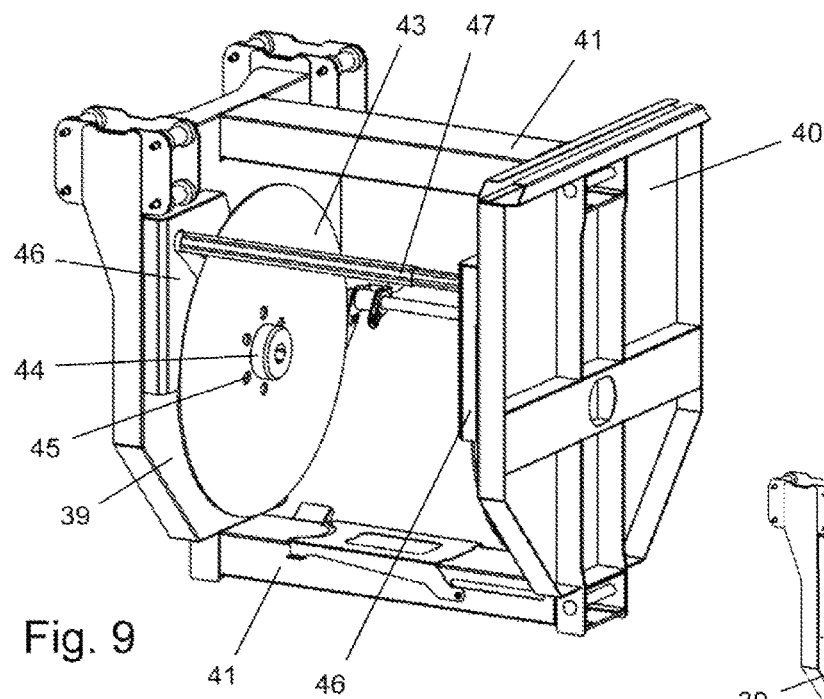
FIG. 9 is a perspective view of a right side roller enclosure seen from behind, its telescopic arms retracted.

FIG. 9 shows a right side sliding enclosure 37, seen from the rear, which is delimited on each side by a lateral inner panel 39 and a lateral outer panel 40. These lateral panels connect through two similar upper located and lower located telescopic assemblies, each consisting of a tubular support 41 within which lodges a telescopic arm 42, not visible in the present figure (see FIGS. 10,12, 13, 14 and 15).

Inner panel 39 carries an inner revolving disc 43, to which center solidly attaches an inner cylindrical base 44 having a polygon shaped orifice coinciding with the polygonal cross section of roll-up shaft 23. In addition, a plurality of perforations 45 on disc 43 surround cylindrical base 44 for the purpose of the insertion of prongs 25 therein (see FIG. 22).

Continuing with FIG. 9, on the inner faces of both panels 39 and 40 are located casings 46 that cover a mechanical drive by means of which, as will be seen, the movement of disc 43 is conveyed to its counterpart outer revolving disc 49 (see FIGS. 21, 22 and 23) through a telescopic drive shaft 47. As a final comment on FIG. 9, sliding enclosure 37 is seen in its closed position, thus determining a minimum width configuration.

Figure 10:
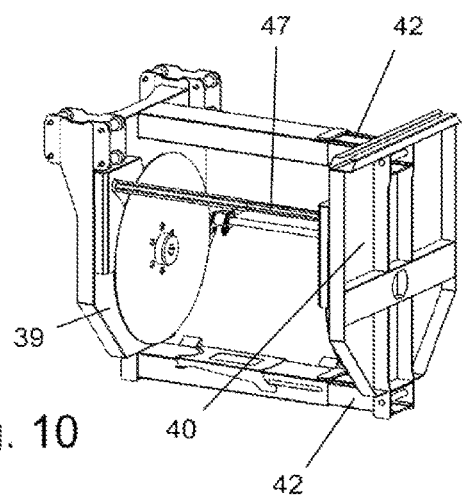
FIG. 10 is a perspective view of the previous figure with its telescopic arms extended.

FIG. 10 shows the same view of the right side sliding enclosure with telescopic arms 42 extended outward and now visible. This view shows that inner panel 39 is solidly mounted to tubular supports 41, whilst outer panel 40 is equally mounted to corresponding telescopic arms 42. This establishes further distance between panels 39 and 40 in contrast to the previous closed position of FIG. 9, thus determining a maximum width configuration in this open position. It will also be noticed that telescopic drive shaft 47 has extended to fit the new configuration.

Figure 11:
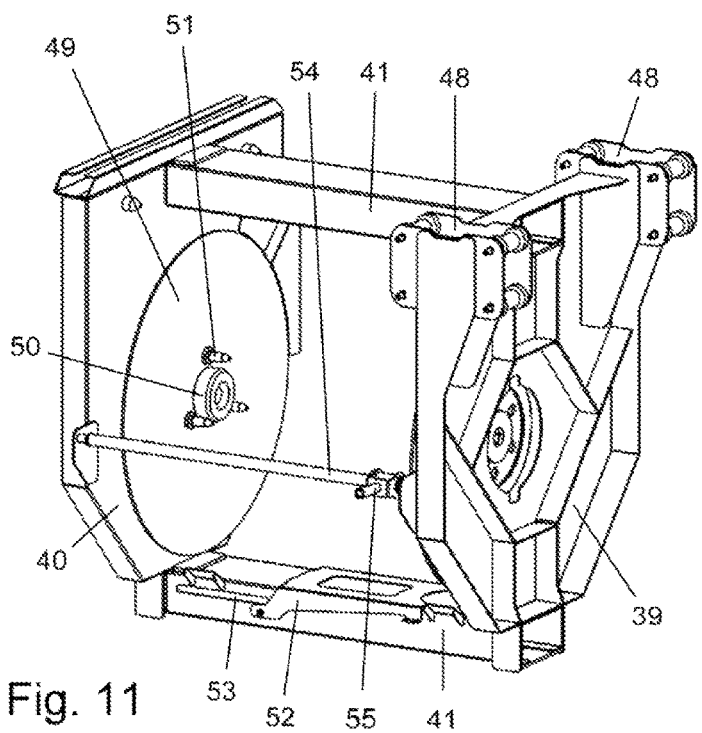
FIG. 11 is a perspective view of the same left side roller enclosure seen from the front, its telescopic arms retracted.

FIG. 11 shows a front view of the same right side sliding enclosure 37 in closed position. Two bogie type sliders 48 are mounted at the top of inner panel 39. These bogie type sliders are fitted with low friction cylindrical rollers that travel on the two frontally located crossbars 27 (see FIG. 4), which act as rails or guides that support the weight of sliding enclosures 37 and 38 along with the plastic they collect. Outer revolving disc 49 mounted on outer panel 40 is noticeable. An outer cylindrical base 50, which is centrally and solidly attached to disc 49, can have a round smooth orifice into which the rounded stub end of roll-up shaft 23 inserts during work (see FIG. 21). Nonetheless, this cylindrical base 50 can also have a polygon shaped orifice into which a similarly shaped roll-up shaft stub end would fit because as will be shown, the assembly components work synchronously such that alignment between them is maintained. Bolted to outer disc 49 and surrounding cylindrical base 50 there is a plurality of outer prongs 51, similar and complementary to inner prongs 25 (FIGS. 3 and 4) in providing initial traction for the plastic band that will be rolled up. Installed on lower tubular support 41 is a pivoting stand 52 for the purpose of propping up consumable tube 59 that is used on initiation of the plastic retrieval procedure, as will be explained. Slots 53 can be seen on both sides of lower tubular support 41. On the frontal side can be seen a telescopic rod 54 along which runs a twine delivery slider 55. In this FIG. 11 telescopic drive shaft 47 is hidden from view by upper tubular support 41 in the foreground.

Figure 12:
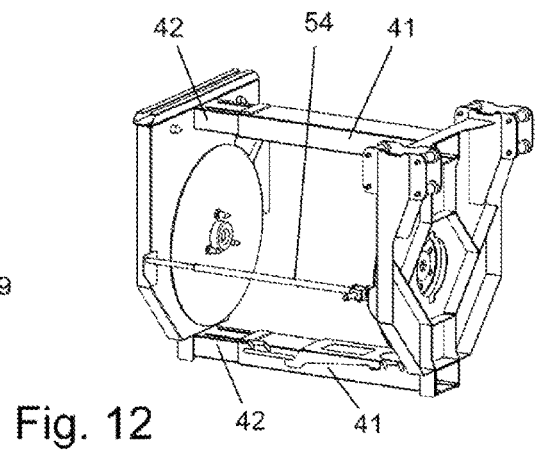
FIG. 12 is a perspective view of the previous figure with its telescopic arms extended.

FIG. 12 shows the same view of FIG. 11 but in its maximum width configuration, that is with telescopic arms 42 in extended position as they jut out from tubular supports 41. Likewise telescopic rod 54 has lengthened to adjust to larger separation between lateral panels.

In addition to being open (maximum width configuration) or closed (minimum width configuration) as described, the sliding enclosures can be in either an external or an internal position carried by the bogie type sliders 48. The enclosures are in external position when they move out to the farthermost or distal end point of their trajectory on crossbars 27, whereas they are in internal position when they move in to the innermost or proximal end point of their trajectory on crossbars 27.

Figure 13:
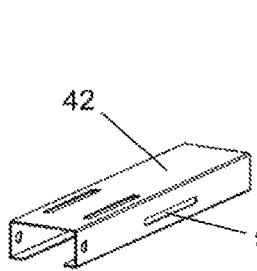
FIG. 13 is a perspective view of two components of a telescopic assembly separated.
Figure 15:
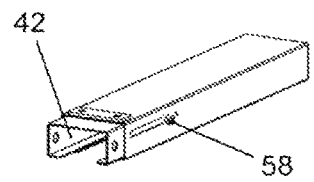
FIG. 15 is a perspective view of two components of a telescopic assembly joined and in a non-extended configuration.

FIG. 13 shows the two basic components of the telescopic assemblies that open and close the sliding enclosures, telescopic arm 42 and tubular support 41, the first of which slides inside the latter with grease lubricant to lessen friction. The lower telescopic assemblies show slots on both sides. Slots 53 are outwardly visible on both laterals of tubular support 41, and slots 56 are also present on both laterals of telescopic arm 42. As seen in FIG. 14, within the slots of both components moves a stop slide 58 with ends that protrude from the slots so that the stop slide remains locked in. Slide stop 58 limit the extension and retraction of the upper and lower telescopic assemblies of the sliding enclosures when attaining maximum and minimum width configurations. The protruding ends of the slide stop also serve the purpose of nudging the base of pivoting stand 52 to pull it down to horizontal position (FIG. 11) when telescopic arm 42 is retracted, thus pushing the slide stop inward as depicted in FIG. 15 (see also FIG. 33). When the telescopic arm extends as depicted in FIG. 14, pressure on the stop slide is released so the pivoting stand can be righted vertically by hand. Perforations 57 on the telescopic arm seen on FIG. 14 allow insertion of a retaining pin that secures the arm to the hydraulic cylinder yoke 62 (see FIG. 16).

Figure 16:
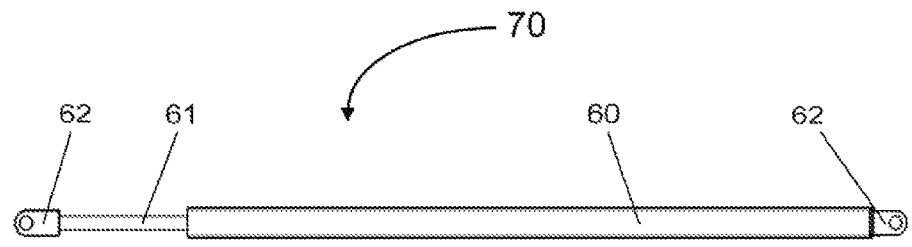
FIG. 16 is a side view of a hydraulic cylinder.

Going on to FIG. 16 a hydraulic cylinder 70 is shown, one of the four cylinders the extractor is equipped with, and which are tasked with lateral motion of sliding enclosures 37 and 38. Each of them has an external tube or barrel 60 and an internal piston rod 61 that moves within the barrel. At the base of barrel 60 and the end section of piston rod 61 are fitted yokes 62, which are perforated so that retaining pins that are associated with the yokes can be anchored to the end attachment points.

FIGS. 17 to 20 depict different work sequences of the telescopic assemblies with the hydraulic cylinders 70 fitted within them. A cutaway view of the lower telescopic assembly depicts the hydraulic cylinder, along with the bottom sections of lateral panels 39 and 40—also observed in cutaway manner—that will be joined by way of their top sections to the upper telescopic assembly (not shown), which is exactly similar to its lower located counterpart. Each telescopic assembly comprises tubular support 41 and telescopic arm 42. The hydraulic cylinders and consequently lower and upper telescopic assemblies open and close synchronously in relation to one another.

Figure 17:
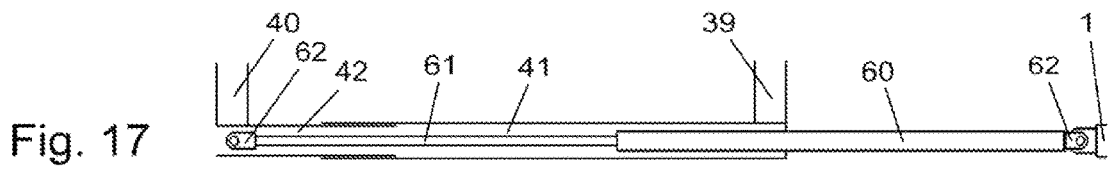
FIG. 17 is a side view of a hydraulic cylinder in a housing and in one operational position.

FIG. 17 depicts the sliding enclosure combining external and open (maximum separation) positions. At its base or proximal end, yoke 62 of the hydraulic cylinder connects to lower beam 1 through an intermediate anchoring bracket (not numbered). Piston rod 61 through its yoke 62 and a retaining pin (not numbered) attaches to the outer or distal point of telescopic arm 42, the latter conjoined to outer panel 40. The inner or proximal point of tubular support 41 is in turn conjoined to inner panel 39. Hydraulic cylinder 70 is here fully extended; consequently telescopic arm 42 is also extended. Lateral panels 39 and 40 (and thus also revolving discs 43 and 49 that both panels respectively hold) are open, or at their maximum in-between distance.

Figure 18:
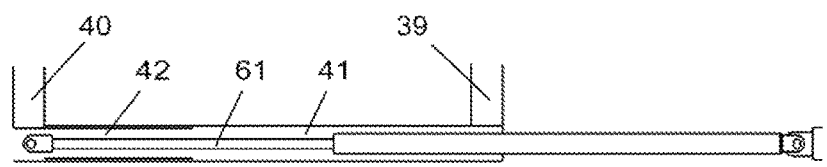
FIG. 18 is a side view of a hydraulic cylinder in a housing and in a second operational position.

In FIG. 18, the sliding enclosure combines external and closed (minimum separation) positions. The hydraulic cylinder has retracted piston rod 61, as a result of which telescopic arm 42 has moved completely inside tubular support 41 and panels 39 and 40 are at their point of minimum in-between distance.

Figure 19:
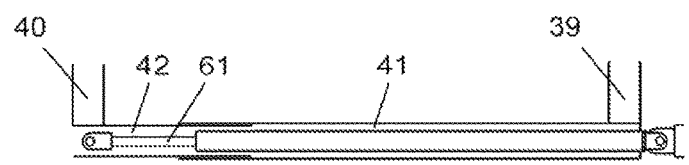
FIG. 19 is a side view of a hydraulic cylinder in a housing and in a third operational position.

In FIG. 19, the sliding enclosure has moved in and combines internal and open (maximum separation) positions. It can be observed that tubular support 41 completely envelops barrel 60 of the hydraulic cylinder, but piston rod 61 has not retracted and therefore panels 39 and 40 are at their point of maximum in-between distance.

Figure 20:
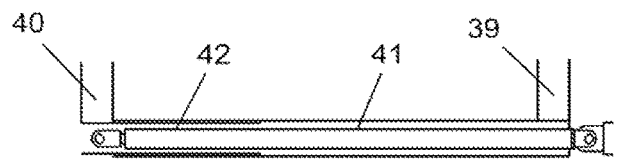
FIG. 20 is a side view of a hydraulic cylinder in a housing and in a fourth operational position.

In FIG. 20, the sliding enclosure is in internal and closed (minimum separation) positions. Telescopic arm 42 has retracted completely into tubular support 41, reason for which lateral panels 39 and 40 are at their point of minimum in-between distance.

The hydraulic cylinder may tend to first move the sliding enclosure to its internal or external position, or alternatively it could first move telescopic arm 42 to its open or closed position, depending upon which of them displays less friction and resistance. Independently of the order in which the movements take place, every launching or commencement action will end with the sliding enclosures positioned as in FIG. 17, and every closure action will end with the sliding enclosures positioned as in FIG. 20.

FIGS. 21 to 24 allow understanding the connection between the assemblages shown in FIGS. 3 to 5 and the sliding enclosures shown in FIGS. 8 to 12. These drawings omit a number of sliding enclosure elements such as lateral panels 39 and 40, telescopic assemblies, other attachment components such as crossbars, etc., in order to facilitate comprehension of the connection.

Observing FIG. 21, it can be deducted from the position of telescopic drive shaft 47 in the background behind other components and the drive elements on the left side of the drawing, that a left sliding enclosure 38 is being shown. Sprocket 21 (left side) has a shaft 63 that connects to its counterpart sprocket 21 (on the right hand side of the extractor). As previously described, sprocket 21 is affixed steadfastly to discoid plate 24 and roll-up shaft 23, and receives movement from sprocket 19 through roller chain 20. It can be seen that discoid plate 24 is resting against inner revolving disc 43 and therefore inner prongs 25 (not visible except for the nuts that hold them) are inserted in corresponding perforations 45 on mentioned revolving disc 43 (see FIG. 9) to apply pushing force. All other components in the drawing belong to sliding enclosure 38 (FIG. 8). A rotatable ring coupling 67, not previously shown in the present disclosure, is attached to the inside face of inner panel 39 (see FIG. 9) and to the outside face of inner revolving disc 43, thus conjoining both components and allowing disc 43 to gyrate on a ball bearing circular groove that is part of said ring coupling 67. In addition and also not previously shown, a sprocket 64 is solidly affixed to the outside surface of inner revolving disc 43, from which a roller chain 65 drives a first sprocket 66 located within a first casing 46 (see FIG. 9) rotationally mounted on telescopic drive shaft 47 (FIG. 9) that drives a second rotationally mounted sprocket 66 at the distal end of telescopic drive shaft 47, similar to the first and fitted within a second casing 46 (see FIG. 9). The distal end of roll-up shaft 23 can be seen inserted in cylindrical base 50 of revolving disc 49.

Going on to FIG. 22, a second sprocket 64 is seen affixed to the outside surface of outer revolving disc 49. The latter, through a second roller chain 65 driven by second sprocket 66, receives movement transmitted from inner revolving disc 43 so that a synchronized gyration regime is established between both discs. In a manner exactly similar to disc 43, disc 49 is mounted on a ball bearing coupling attached to the inside of corresponding lateral panel 40 (FIG. 11), similar to previously seen rotatable ring coupling 67 (FIGS. 21 and 23) but which has been omitted in this figure. Also omitted is any pictorial depiction of an attachment means of the fixed outer prongs 51 to the outside face of outer revolving disc 49.

Going next to FIG. 23, the way that components interact explains the sideways motion of the sliding enclosures. Pushed to its outermost position by hydraulic cylinders 70 (not shown) that drive the telescopic assemblies (not shown) connected to lateral panels 39 and 40 (not shown), the sliding enclosure disconnects from the power transmitted by discoid plate 24 as soon as its prongs 25 cease to be inserted in matching perforations 45 of disc 43. It can be appreciated how roll-up shaft 23 maintains its rotational position unchanged relative to the rotational position of disc 43 throughout lateral displacement and gyration because of its polygonal cross section.

Finally, in FIG. 24 can be seen a detail not shown in other drawings. Reinforcing brackets 68 buttress the connection between sprocket 21 and discoid plate 24 and exemplify the considerable torque or moment of force that this junction point endures. Work aspects of the machine can be deducted from the torque that is produced. Firstly, it becomes clear why prongs 25 are the mainstay for transmitting force and that the contribution of roll-up shaft 23 is minimal, as it would suffer deformation if having to withstand by itself the high moment of force generated to roll up the bag.

Secondly, it becomes clear that besides conveying movement to inner disc 43, it is necessary to drive outer disc 49. It is essential that rotation speed of the discs be identical, so interconnection must be via sprockets and chains, synchronous belts and pulleys, or an alternative method that allows synchronizing the movement of both discs. The lateral pressure exerted by the plastic on the discs is enormous and it is critical that discs 43 and 49 revolve at identical speed and pull with similar force, as a slip or velocity differential would cause destructive damage.

All this allows inferring that roll-up shaft 23 with its polygon shaped cross section has the main purpose of ensuring that prongs 25 are always aligned with disc perforations 45. A second function of shaft 23 is the firm insertion of its distal end in outer revolving disc 49, more precisely nestled inside cylindrical base 50 (FIG. 21), providing assembly rigidity. Thus, during work all intervening components form a winding spool of significant structural strength, with no relative movement between parts.

Figure 25:
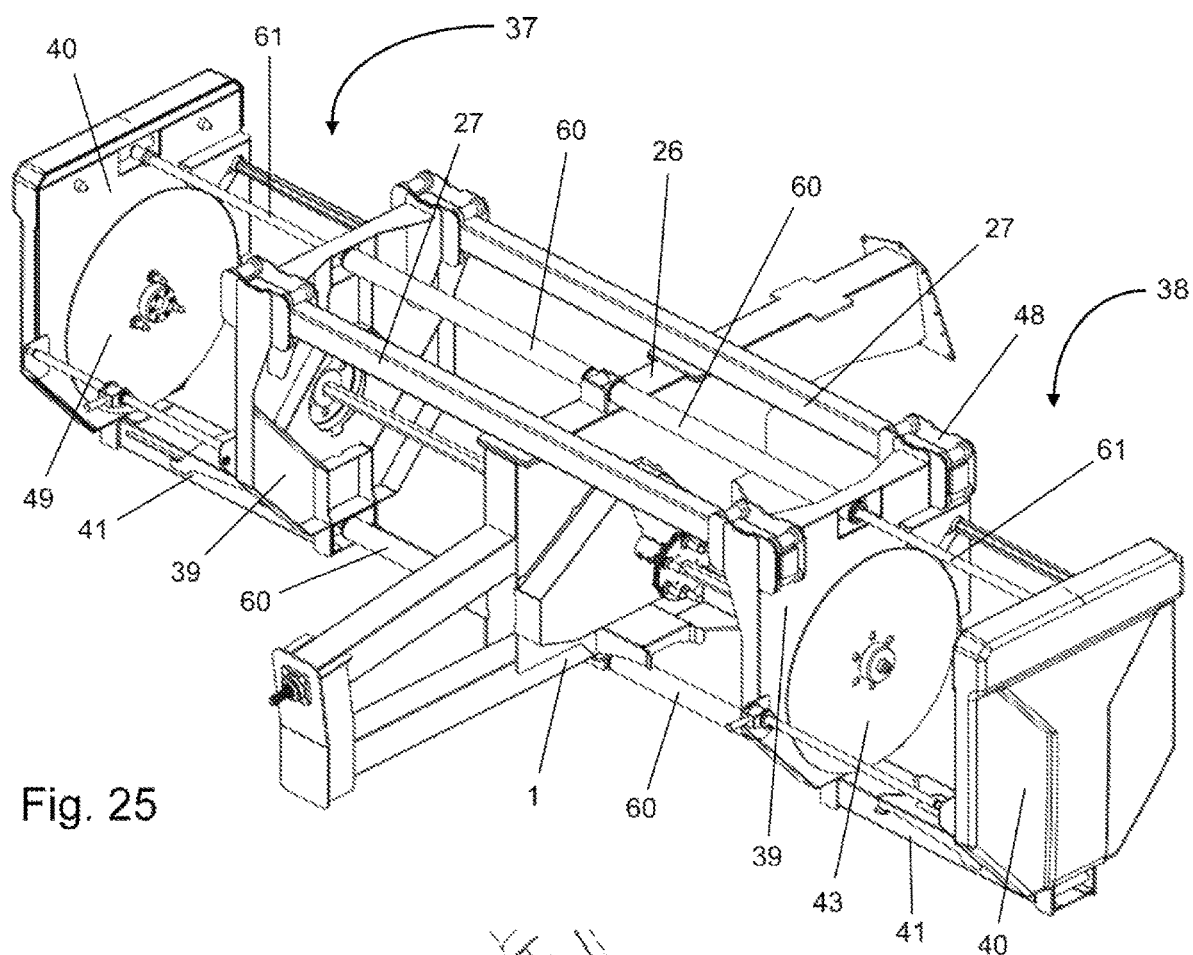
FIG. 25 is a perspective view of an extractor frame shown with its corresponding left and right side sliding enclosures in their outer positions with corresponding support crossbars, hydraulic cylinders and telescopic assemblies.

FIG. 25 is a partial view, a view that includes some of the main components of the present disclosure, in which can be observed right and left sliding enclosures 37 and 38 in their external and closed (retracted) positions. The sliding enclosures travel sideways over crossbars 27, each of them propelled by its two corresponding upper and lower hydraulic cylinders. The upper left and right side hydraulic cylinders are not covered by the respective telescopic assemblies, so their piston rods 61 and barrels 60 are visible, the latter showing their bases anchored to the higher section of central body 26. In turn, the lower left and right side cylinders are shown with their telescopic assemblies attached. Their barrels 60 are anchored to lower beam 1 whilst tubular supports 41 hide the corresponding rods 61. Telescopic arms 42 are not visible as they are retracted inside their respective tubular supports 41 (closed position), the hydraulic cylinders not having extended fully. Also observable are the bogie type sliders 48 mounted on inner panels 39, one inner revolving disc 43, one outer revolving disc 49, and outer panels 40. The position of the sliding enclosures is equivalent to the position depicted in FIG. 29.

Figure 26:
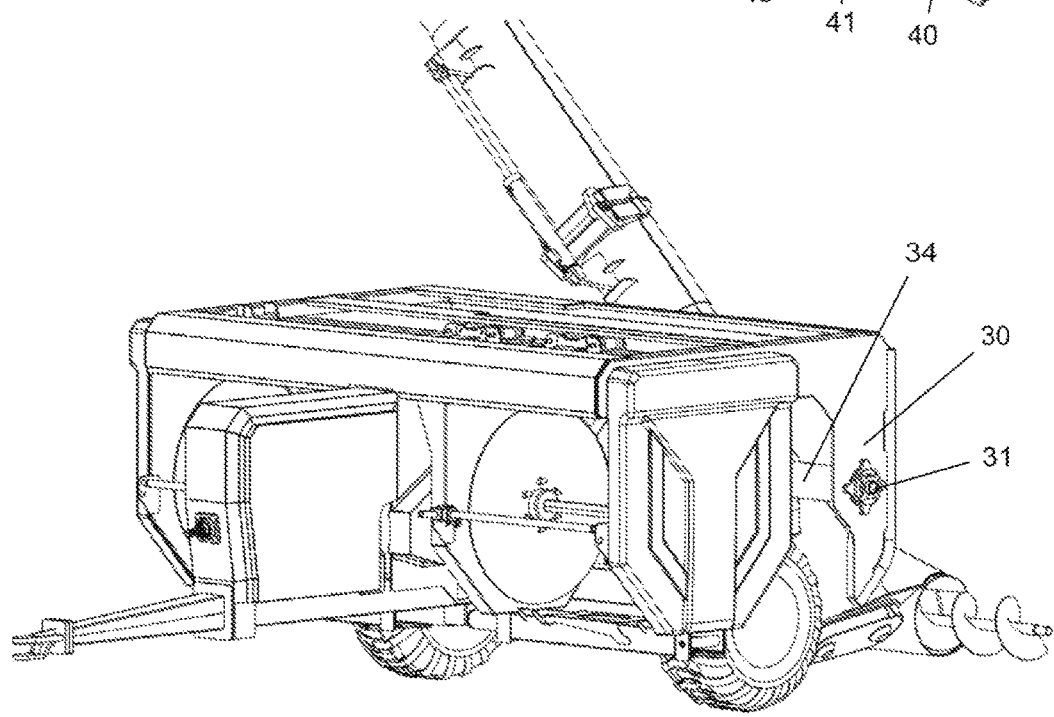
FIG. 26 is a partial perspective view of a complete assembled extractor with its sliding enclosures in their inner positions and some components pointed out.

FIG. 26 is a perspective view of the extractor with the sliding enclosures in their internal and closed positions, and with corresponding telescopic arms retracted. Free-turning roller 34 is observable, supported by pillow blocks 31 and lateral deflectors 30 that are shown on one side of the machine. The position of the sliding enclosures is equivalent to the position depicted in FIG. 27.

4) Detailed Sequence from Initiation Up to Bale Release

FIGS. 27 to 38 show the extractor of the present disclosure going through a succession of steps from initiation of an extracting procedure to its termination. Only the right side of the machine is shown, observed from the viewing point of the operator standing and looking at the frontal part of the sliding enclosures. Of course the same steps take place on the left side of the machine. Even though the upper telescopic assembly is not completely visible, partially hidden by a cover or fairing, its movement is similar to that of its lower telescopic assembly counterpart.

Figure 27:
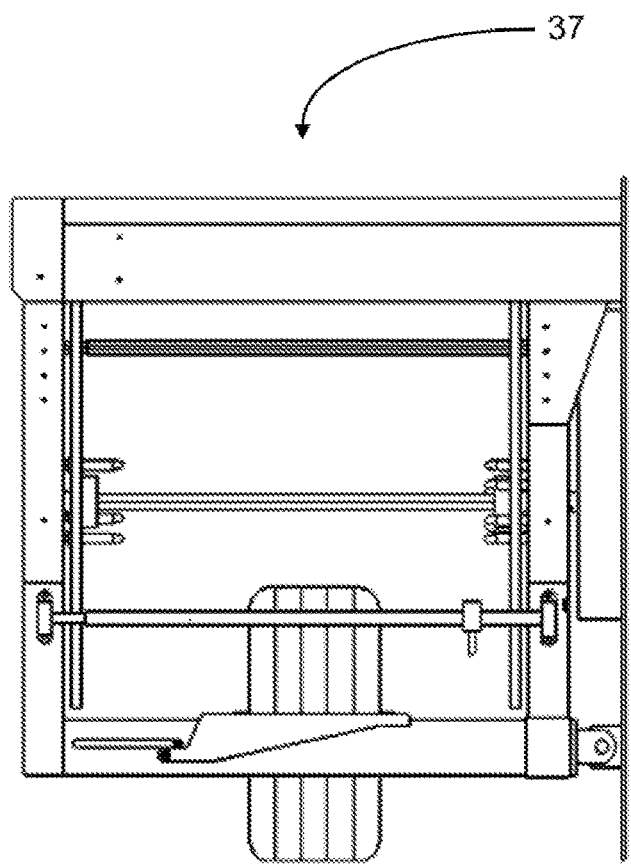
FIG. 27 is a front view of the extractor's right half showing a first step in the sequence of plastic collection up to final ejection of the finished bale.

FIG. 27 shows the extractor with sliding enclosure 37 in its combined internal and closed positions, its hydraulic cylinder (not visible) completely retracted. This figure has its correspondence with the position of the hydraulic cylinder in FIG. 20.

Figure 28:
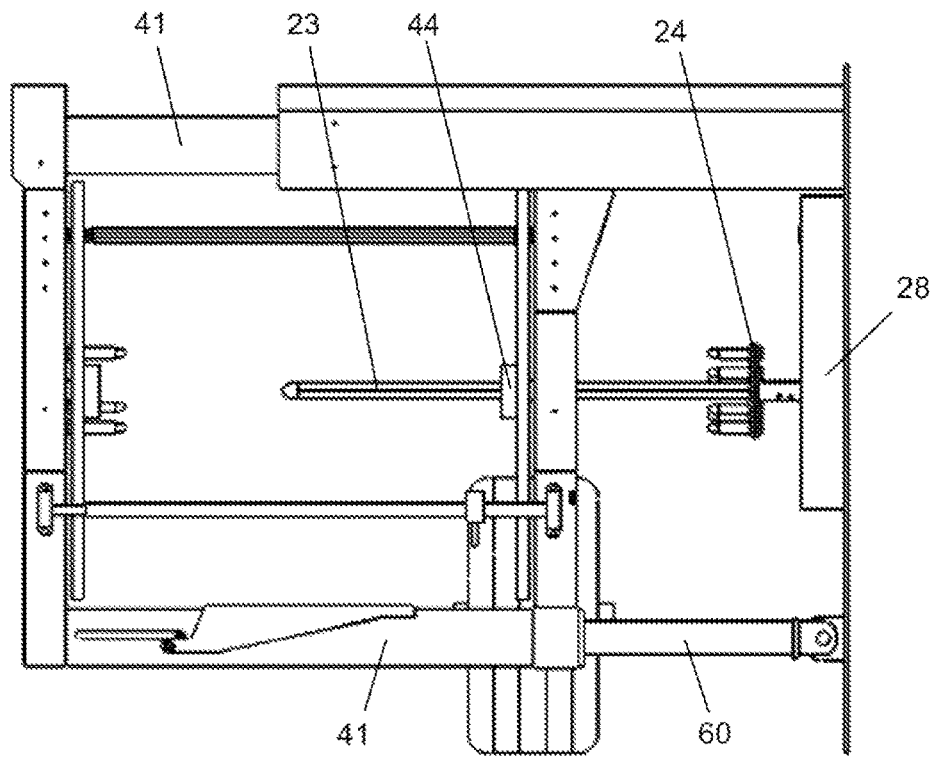
FIG. 28 is a front view of the extractor's right half showing a second step in the sequence of plastic collection up to final ejection of the finished bale.

FIG. 28 shows the hydraulic cylinder initiating its movement outward, whereupon its barrel 60 begins to be visible as the sliding enclosure travels laterally away from the machine's central body 26 (not depicted), from which protrudes sprocket housing 28 that encloses part of the transmission. Roll-up shaft 23 slides through inner cylindrical base 44. In this instance, telescopic arms 42 have not extended yet because the sliding enclosure not being weighed down by plastic tends to offer less resistance to movement than the mentioned telescopic arms. The hydraulic motor is not operating at this point, so discoid plate 24 and roll-up shaft 23 do not turn.

Figure 29:
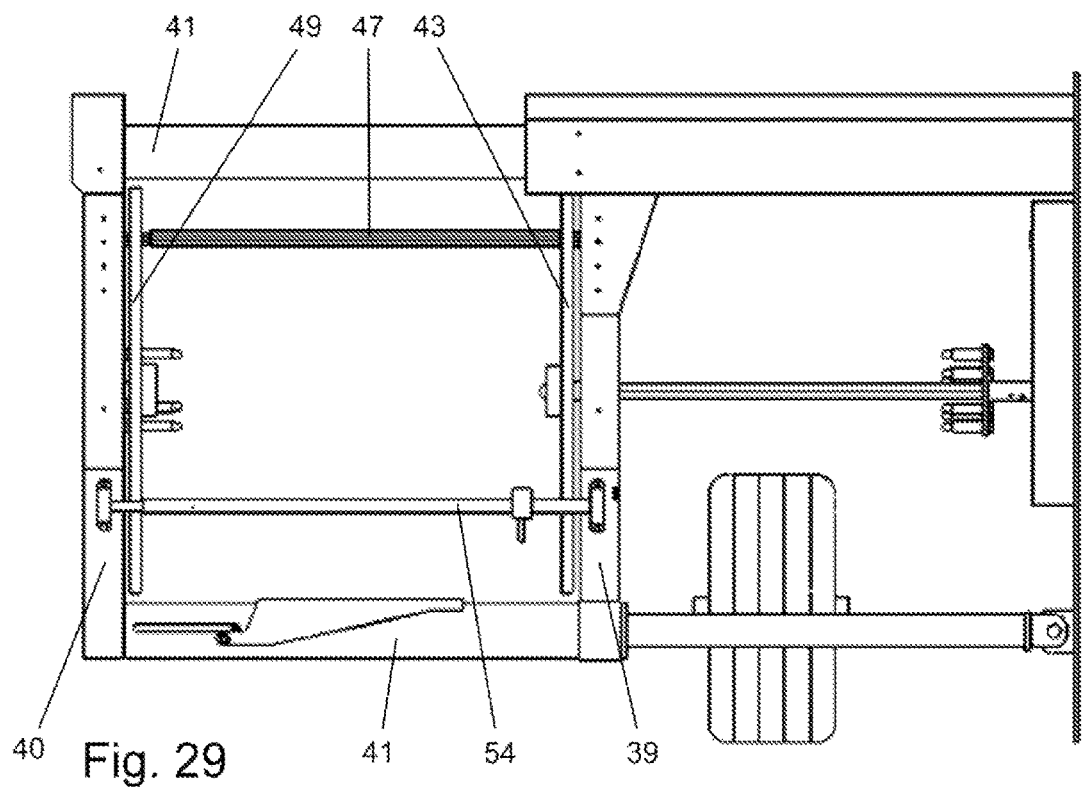
FIG. 29 is a front view of the extractor's right half showing a third step in the sequence of plastic collection up to final ejection of the finished bale.

FIG. 29 shows the sliding enclosure in its combined external and closed position. The inner and outer panels 39 and 40, and consequently their respective revolving discs 43 and 49, continue to maintain minimum separation distance such that telescopic rod 54 has not extended whilst telescopic drive shaft 47 has been pulled along with the sliding enclosure, its distal section associated with outer panel 40 and rotationally connected to sprocket 66 (not visible) within the aforementioned panel. The sliding enclosure in its external and closed position of FIG. 29 has its correspondence with the position of the hydraulic cylinder in FIG. 18.

Figure 30:
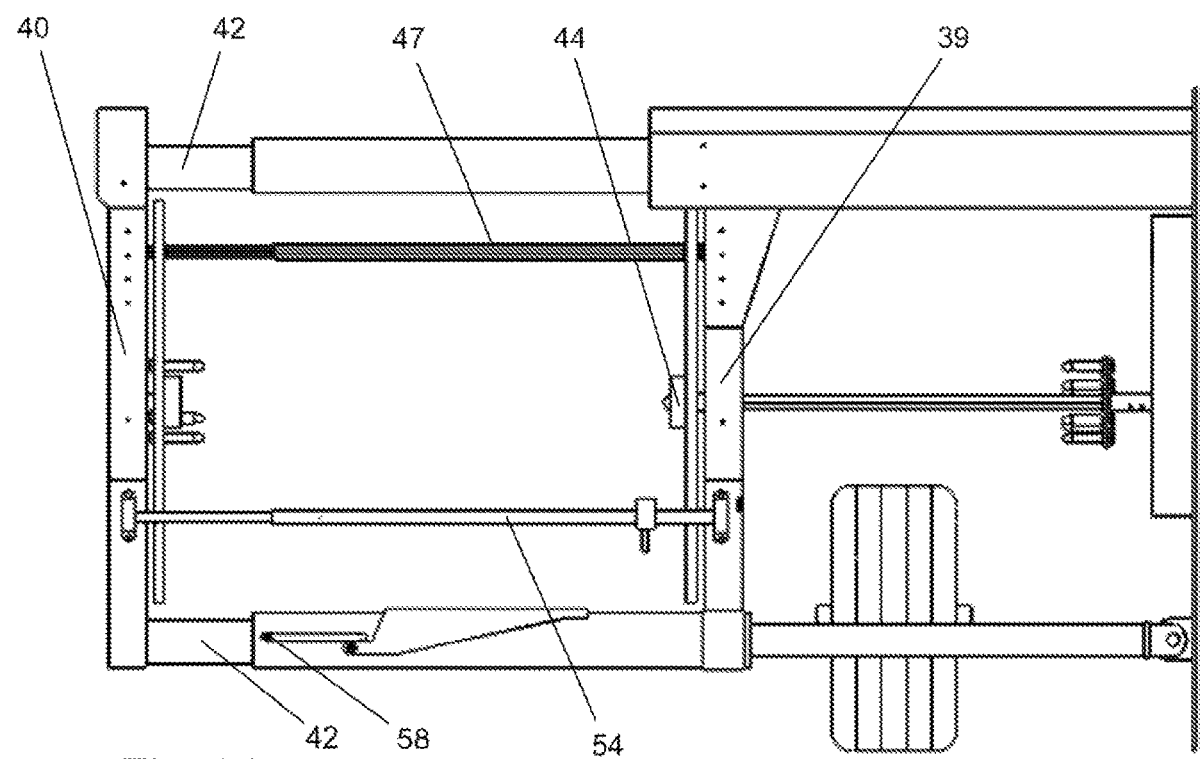
FIG. 30 is a front view of the extractor's right half showing a fourth step in the sequence of plastic collection up to final ejection of the finished bale.

FIG. 30 shows the sliding enclosure in its combined external and open positions, with telescopic arms 42 extended. Telescopic rod 54 has extended and inner and outer panels 39 and 40 now hold maximum separation distance. Telescopic drive shaft 47 has extended to its maximum length. Inner cylindrical base 44 is depicted and intervenes in the next step. Note that slide stop 58 has slid outward in contrast to preceding figures, pushed by telescopic arm 42 moving out. The sliding enclosure in its external and open position of FIG. 30 has its correspondence with the position of the hydraulic cylinder in FIG. 17.

Figure 31:
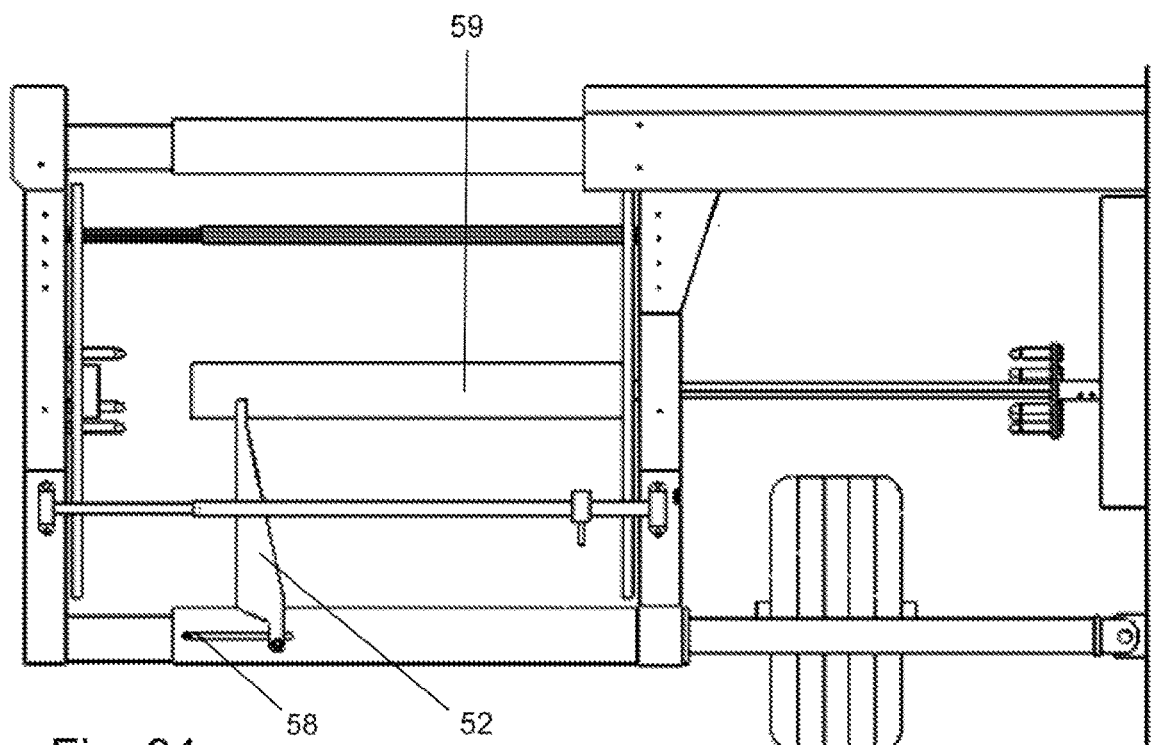
FIG. 31 is a front view of the extractor's right half showing a fifth step in the sequence of plastic collection up to final ejection of the finished bale.

FIG. 31 shows pivoting stand 52, previously lying horizontal on tubular support 41 (see preceding Figs.) manually set to a vertical position. This is made possible when slide stop 58 is pushed outward by telescopic arm 42 and no longer wedges the pivoting support. The operator inserts one end of consumable tube 59 externally around cylindrical base 44 (hiding it) and props the other end upon pivoting stand 52.

Figure 32:
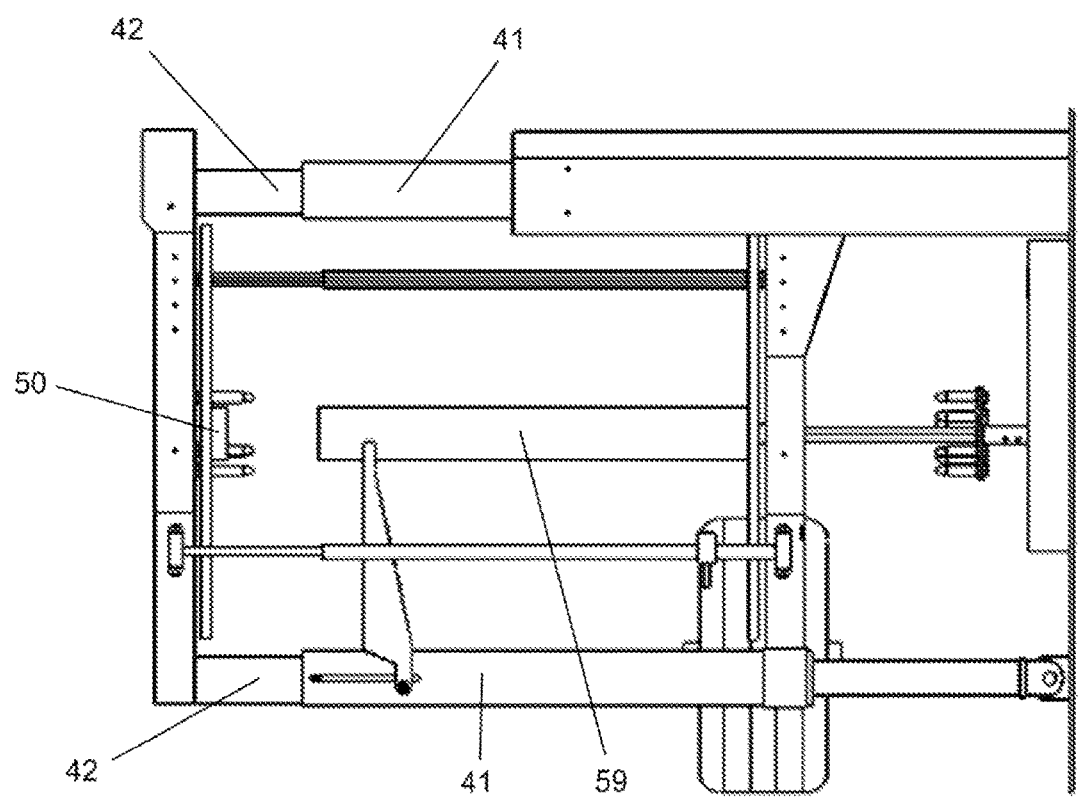
FIG. 32 is a front view of the extractor's right half showing a sixth step in the sequence of plastic collection up to final ejection of the finished bale.

FIG. 32 shows the hydraulic cylinder beginning to close and pull in tubular support 41. Telescopic arms 42 have remained extended so the gap measurement between consumable tube 59 and outer cylindrical base 50 remains unchanged from previous FIG. 31.

Figure 33:
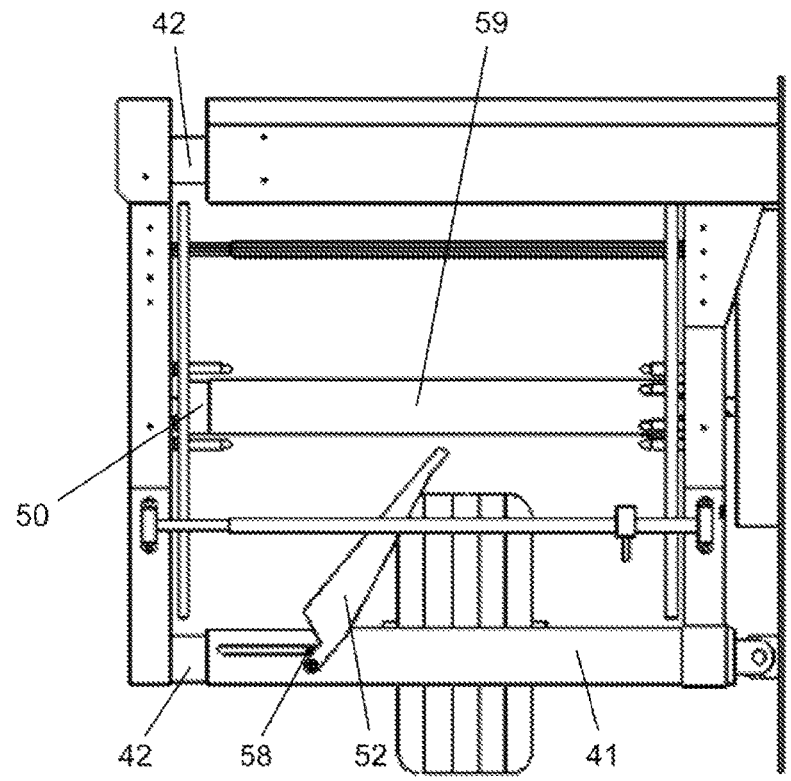
FIG. 33 is a front view of the extractor's right half showing a seventh step in the sequence of plastic collection up to final ejection of the finished bale.

FIG. 33 shows the hydraulic cylinder continuing to close. Once tubular supports 41 have made a stop against the machine's central body 26, telescopic arms 42 begin to retract. As consumable tube 59 approaches outer cylindrical base 50, slide stop 58 is pushed in by the retracting lower telescopic arm 42 pushes in slide stop 58, which in turn pushes against pivoting stand 52 to lay it horizontal.

Figure 34:
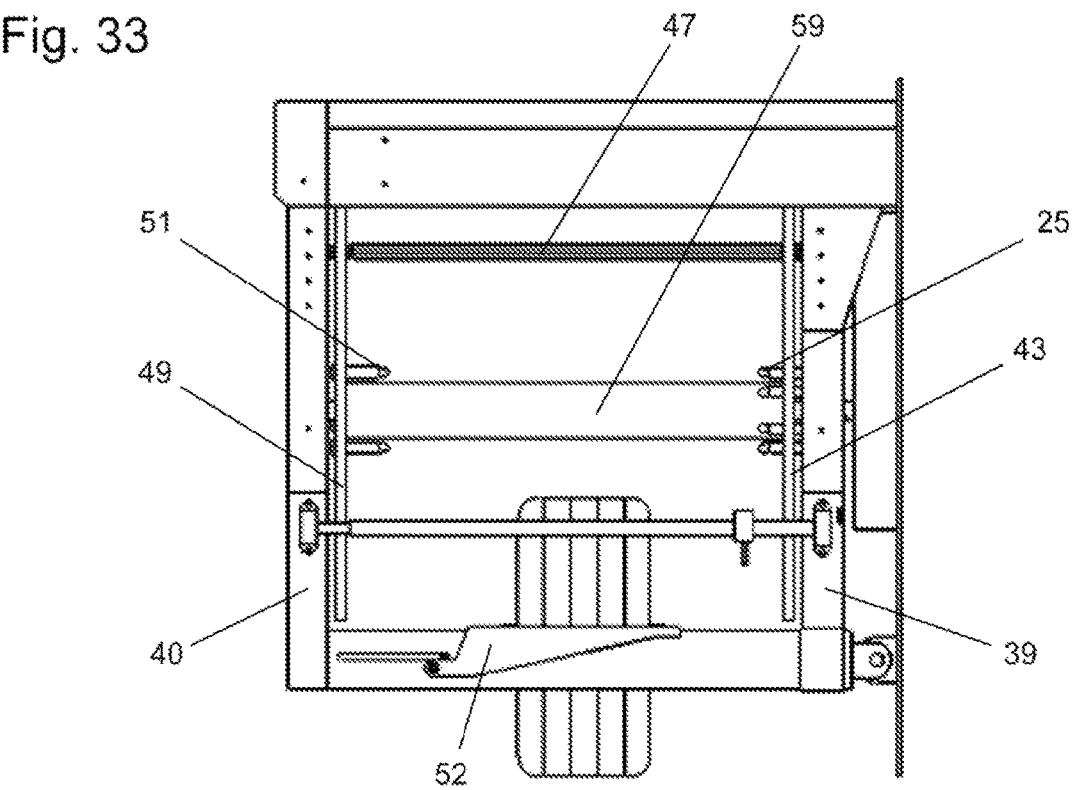
FIG. 34 is a front view of the extractor's right half showing an eighth step in the sequence of plastic collection up to final ejection of the finished bale.

FIG. 34 shows the consumable tube fully mounted around cylindrical bases 44 and 50 and enveloping them. Pivoting stand 52 has returned to horizontal position. Inner prongs 25 are inserted in inner revolving disc 43, so when beginning to gyrate they will also drive outer revolving disc 49 through telescopic drive shaft 47 and the intermediary array of sprockets and chains affixed to the side panels and rear section of the revolving discs. At this point of the sequence the collection of plastic will begin. This figure once again corresponds with the position of the hydraulic cylinder in FIG. 20.

Before commencing the actual collection of used plastic, two longitudinal cuts are done on the initial part of the bag (which is left empty of material), one on its topmost section and another on its lowermost section, whereupon those cuts will be continued by cutter blades 32 and 33 (not visible in this sequence of drawings). Once the bag is separated into two bands, these are attached to the corresponding right side and left side sliding enclosures. To accomplish the attachment, small incisions with a penknife or such are made on the plastic in order to force the perforated sheet through a few of the prongs at each side of the corresponding sliding enclosure. In the case of enclosure 37 of present FIG. 34, one flank of the right side plastic band is hooked to outer prongs 51 and the other flank of the band is hooked to inner prongs 25. If FIG. 34 were three-dimensional, the plastic band would enter from behind the figure.

On turning on hydraulic motor 16 (FIG. 3) parts of the transmission are seen to move, namely revolving discs 43 and 49, telescopic drive shaft 47, and prongs 25 and 51 before being covered by the incoming plastic. The prongs pull in firmly and in a few turns the plastic tightens around the consumable tube with no possibility of slipping.

Figure 35:
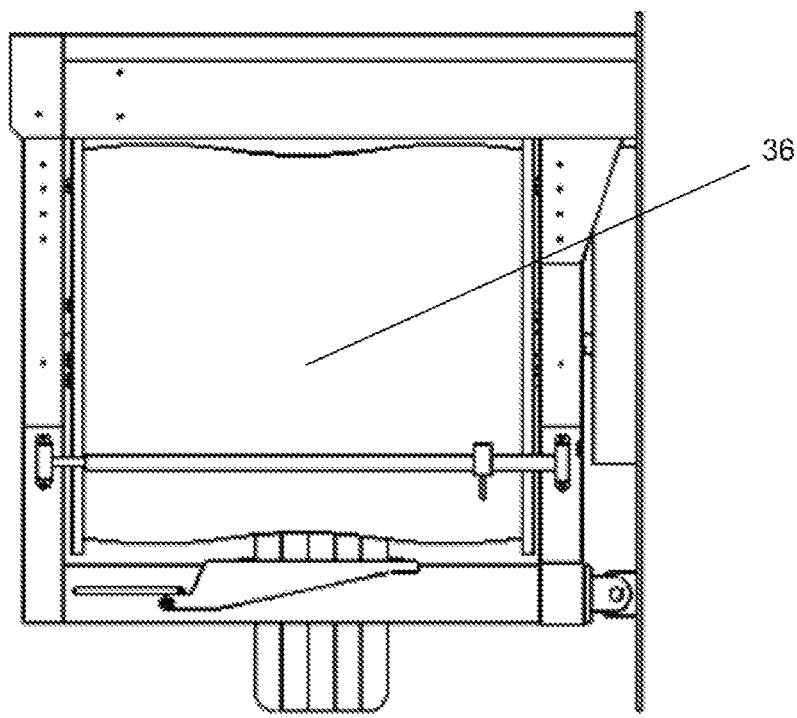
FIG. 35 is a front view of the extractor's right half showing a ninth step in the sequence of plastic collection up to final ejection of the finished bale.

FIG. 35 shows the gathered right side plastic band, assembled in the shape of a cylindrical bale 36 with flat faces that exert pressure against the inner and outer revolving discs.

Figure 36:
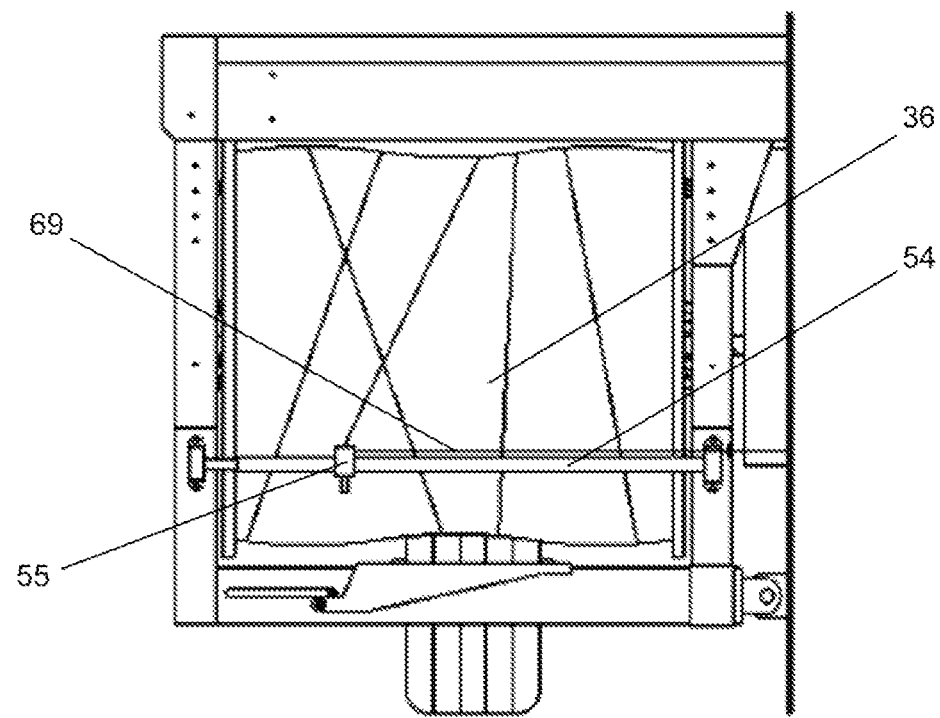
FIG. 36 is a front view of the extractor's right half showing a tenth step in the sequence of plastic collection up to final ejection of the finished bale.

FIG. 36 shows used plastic bale 36 being tied up. A roll of twine (not shown) delivers twine 69 through ring brackets (not shown) to twine delivery slider 55 that runs along telescopic rod 54. Cylindrical bale 36 is made to turn hydraulically whilst the operator moves slider 55 from side to side until several turns of twine surround the bale, after which it is cut and tied with a knot. This prevents the bale from unraveling when manipulated. On finishing the tying procedure, the action of hydraulic motor 16 (see FIG. 3) also comes to an end. Thus it can be construed that the assemblage that provides circular motion to the roll-up shafts performs its role during the stages depicted in FIGS. 34, 35 and 36.

Figure 37:
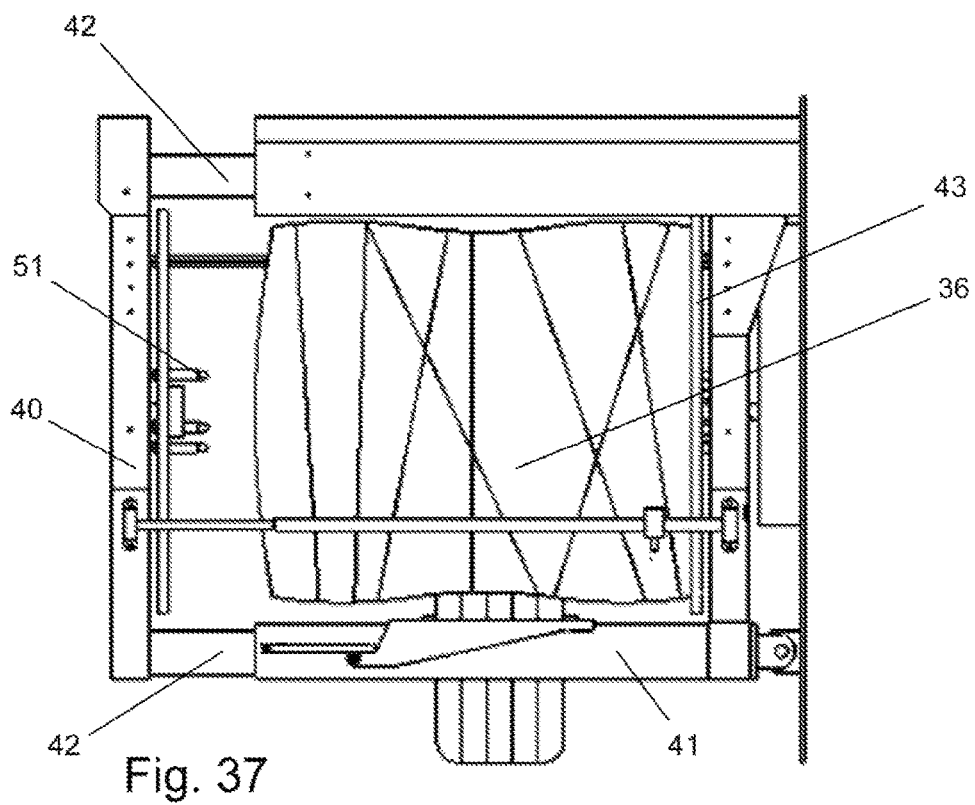
FIG. 37 is a front view of the extractor's right half showing an eleventh step in the sequence of plastic collection up to final ejection of the finished bale.

FIG. 37 shows the extractor with sliding enclosure 37 in its combined internal and open positions, with hydraulic cylinders opening. In this case it is telescopic arms 42 that are extending whilst the sliding enclosure remains in its internal position. This is because the weight of bale 36 causes tubular supports 41 to oppose more resistance to hydraulic cylinder thrust than telescopic arms 42. Prongs 51 dislodge from the plastic bale as they move away from outer panel 40. Inner revolving disc 43 will now begin to push outward against the bale's flat face. The sliding enclosure in the internal and open position of the present figure has its correspondence with the position of the hydraulic cylinder in FIG. 19.

Figure 38:
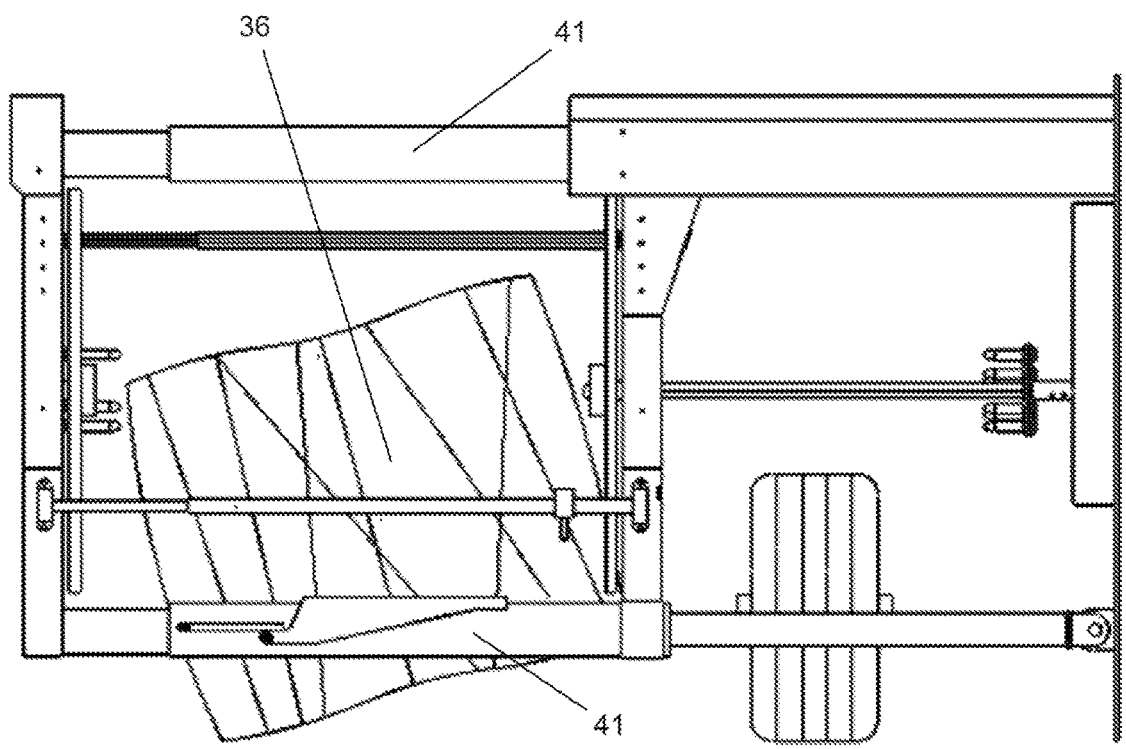
FIG. 38 is a front view of the extractor's right half showing a final step in the sequence of plastic collection up to final ejection of the finished bale.

FIG. 38 shows full aperture of the hydraulic cylinders, with tubular supports 41 having moved to their outer position and telescopic arms 42 extended. Panels 39 and 40 are in their separated position, and with no more support from roll-up shaft 23 plastic bale 36 dislodges and falls to the ground. The sliding enclosure in the external and open position of the present figure has its correspondence with the position of the hydraulic cylinder in FIG. 17.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An extractor of material stored in silo bags that rolls up used plastic and ejects the resultant bales, comprising:
    a discharge tube that goes inside the silo bag and projects in the direction of a grain truck, or equivalent container, that advances adjacent to the extractor;
    a transverse sweep auger or a plurality of transverse sweep augers that direct the material toward said discharge tube;
    cutter blades or equivalent cutting means that divide the silo bag in two continuous plastic bands that originate from at least two differentiated cuts carried out while said bag is being emptied, whereupon said continuous plastic bands are directed to respective roll-up shafts located within sliding enclosures located on a right side and a left side of said extractor;
    said sliding enclosures capable of moving sideways along a horizontal axis defined by said roll-up shafts and perpendicularly to the line of travel of said extractor; wherein said roll-up shafts are stationary in relation to the sideways movement of said sliding enclosures;
    and said roll-up shafts capable of gyrating to generate the traction needed to pull the extractor along while simultaneously rolling up said continuous plastic bands around consumable tubes until completion of two highly compacted bales of used plastic that are then ejected in conjunction with said consumable tubes.

2. The extractor of material stored in silo bags of claim 1, wherein a first longitudinal continuous cut on the upper section of said bag is made by a first cutter blade or its equivalent, and a second longitudinal continuous cut on the lower section of the bag is made by means of a second cutter blade, or its equivalent, such that said cuts achieve full separation of said bag in two bands of plastic.

3. The extractor of material stored in silo bags of claim 1, further comprising lateral deflectors through which said bag is directed after receiving a first cut on its upper section, whereby said lateral deflectors restrict said bag to a width similar to that of said sliding enclosures on the right side and left side of the extractor respectively, when said sliding enclosures are in a work position.

4. The extractor of material stored in silo bags of claim 3, further comprising a free-turning roller positioned horizontally and perpendicular to the line of travel of said extractor, said free-turning roller acting as support for the bottom section of said bag, whereupon a second cut is made in said bag, and which moves the bag into said two continuous bands of plastic.

5. The extractor of material stored in silo bags of claim 2, further comprising crossbars mounted on a central body to form a support rack that runs perpendicular to main beam and projects to both sides of said extractor, further comprising bogie type sliders that travel along said crossbars and to which are attached said sliding enclosures that move from an inner point to an outer point, such that when said sliding enclosures are in a position nearest to said central body they are in an internal position, whereas, if they are in a position farthest from said central body, they are in an external position.

6. The extractor of material stored in silo bags of claim 5, further comprising a hydraulic motor connected to a speed reduction drive that transmits movement to a pair of roll-up shafts, each of which project respectively to the left and right sides of the extractor.

7. The extractor of material stored in silo bags of claim 6, wherein said extractor further comprises a discoid plate affixed to each of said roll-up shafts, each discoid plate comprising a plurality of inner prongs that insert into a matching plurality of perforations of an inner revolving disc to impart gyration movement, each inner revolving disc positioned on each of said sliding enclosures, said inner revolving discs possessing central perforations that allow the passing through of said roll-up shafts.

8. The extractor of material stored in silo bags of claim 7, wherein each sliding enclosure comprises an inner panel to which is attached said inner revolving disc, and each sliding enclosure further comprises an outer panel to which is attached an outer revolving disc that in turn comprises a plurality of outer prongs firmly affixed to it, said revolving discs positioned on the internal faces of said panels.

9. The extractor of material stored in silo bags of claim 8, comprising a first sprocket affixed to the outside part of said inner revolving disc, a roller chain that transmits movement to a second sprocket attached to said inner panel, whereupon said second sprocket being rotationally connected to a telescopic drive shaft transmits movement to a third sprocket attached to said outer panel, from which a second roller chain transmits movement to a fourth sprocket affixed to the outside part of said outer revolving disc.

10. The extractor of material stored in silo bags of claim 9, wherein each of said sliding enclosures comprises an upper and a lower telescopic assembly that connect said inner panel with said outer panel, each of said telescopic assemblies comprised by and driven by a hydraulic cylinder, each of said telescopic assemblies further comprise a tubular support housing a telescopic arm that retracts and extends hydraulically relative to said tubular support;
    said tubular supports of said upper and lower telescopic assemblies are solidly connected to said inner panel, whereas said telescopic arms of said upper and lower telescopic assemblies are solidly connected to said outer panel, whereby upon extending said telescopic arms relative to said tubular supports, the distance between said inner and outer panels increases to take said sliding enclosure to its maximum aperture or open position, whilst upon retracting said telescopic arms relative to said tubular supports the distance between said inner and outer panels decreases to take said sliding enclosure to its minimum aperture or closed position.

11. The extractor of material stored in silo bags of claim 10, wherein said hydraulic cylinders also provide said sliding enclosures with linear motion along the length of said crossbars, wherein said hydraulic cylinders comprise barrels that attach proximally through their bases to the extractor's central body, and wherein said hydraulic cylinders further comprise piston rods that attach through their extremities to the distal ends of said telescopic arms of said telescopic assemblies.

12. The extractor of material stored in silo bags of claim 11, wherein each sliding enclosure comprises an inner cylindrical base and an outer cylindrical base affixed respectively to the central section of the internal faces of the inner revolving disc and of the outer revolving disc, where said inner cylindrical base has a centrally disposed orifice extending therethrough, said centrally disposed orifice coinciding with the central perforation of said inner revolving disc to permit the passing through of said roll-up shaft when said sliding enclosure moves laterally, and wherein said outer cylindrical base possesses a centrally disposed orifice that allows insertion of the distal extremity of said roll-up shaft.

13. The extractor of material stored in silo bags of claim 12, wherein, when said sliding enclosure is in its combined open position and external position, a maximum separation is established between said inner revolving disc and said outer revolving disc, whereby a consumable tube of lesser length than the maximum separation between said inner and outer revolving discs can be manually inserted around said inner cylindrical base, and whereupon a provisional pivoting support can be set up in vertical position manually to support the distal end of said consumable tube to align it with said outer cylindrical base.

14. The extractor of material stored in silo bags of claim 13, wherein, when said sliding enclosure travels to its combined closed position and internal position, a minimum separation is established between said inner revolving disc and said outer revolving disc, wherefore said consumable tube of similar length to the minimum separation between said revolving discs is held firmly in place by said revolving discs and its insertion at both ends in said inner and outer cylindrical bases, whilst simultaneously said plurality of inner prongs of said discoid plate become inserted in said plurality of perforations of said inner revolving disc, and also simultaneously said roll-up shaft coaxially inserts itself within said consumable tube in all its length, wherefore the distal end of said roll-up shaft becomes inserted in the central orifice of said outer cylindrical base.

15. The extractor of material stored in silo bags of claim 13, wherein, when each of said sliding enclosures goes from its open position to its closed position and said pivoting support is vertically positioned, said pivoting support descends automatically to its habitual horizontal position over said tubular support as it is nudged by a slide stop, said slide stop in turn pushed inward by said telescopic arm when said telescopic arm retracts inside said tubular support.

16. The extractor of material stored in silo bags of claim 14, wherein said perforations of said inner revolving disc, and consequently said inner prongs that insert into said perforations, lie outside the perimeter delimited by said inner cylindrical base, whereas said outer prongs affixed to said outer revolving disc lie outside the perimeter delimited by said outer cylindrical base, and furthermore said perforations, inner prongs and outer prongs also lie outside the perimeter delimited by said consumable tube that envelops said cylindrical bases and is installed between said inner and outer revolving discs, whereby the lateral edges of the initial section of each of said continuous plastic bands may be hooked respectively to said inner and outer prongs of each said sliding enclosure, thereby providing traction for said plastic bands to wind around said consumable tubes.

17. The extractor of material stored in silo bags of claim 16, further comprising a telescopic rod and a twine delivery slider, whereby said twine delivery slider runs manually along said telescopic rod so that several turns of twine encircle said highly compacted bales of used plastic while the bale gyrates within said sliding enclosures.

18. The extractor of material stored in silo bags of claim 16, wherein, when said sliding enclosures travel to their combined open position and external position, said plastic bales fall to the ground under their own weight.

* * * * *